US012781655B2

(12) United States Patent
Kinnaird et al.

(10) Patent No.: US 12,781,655 B2
(45) Date of Patent: Nov. 3, 2026

(54) DECOMPOSITION CHAMBER FOR AFTERTREATMENT SYSTEM

(71) Applicant: Cummins Emission Solutions Inc., Columbus, IN (US)

(72) Inventors: Edward Cortez Kinnaird, Columbus, IN (US); Rushil Patel, Chicago, IL (US); Eduardo Alano, Columbus, IN (US); Yash Pal, Una (IN); Nikhil Rajesh Bhamare, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 19/095,560

(22) Filed: Mar. 31, 2025

(65) Prior Publication Data

US 2026/0298121 A1 Oct. 1, 2026

(51) Int. Cl.

| | |
|---|---|
| ***F01N 3/20*** | (2006.01) |
| ***B01F 25/31*** | (2022.01) |
| ***B01F 25/42*** | (2022.01) |
| ***F01N 1/08*** | (2006.01) |
| ***F01N 1/12*** | (2006.01) |

(52) U.S. Cl.

CPC ......... *F01N 3/206* (2013.01); *B01F 25/31112* (2022.01); *B01F 25/42* (2022.01); *F01N 1/086* (2013.01); *F01N 1/12* (2013.01); *F01N 3/208* (2013.01); *F01N 2330/38* (2013.01); *F01N 2610/14* (2013.01); *F01N 2610/1453* (2013.01)

(58) Field of Classification Search

CPC combination set(s) only.
See application file for complete search history.

(56) References Cited

U.S. PATENT DOCUMENTS

| | | | |
|---|---|---|---|
| 1,959,630 | A | 5/1934 | Julius |
| 1,977,241 | A | 10/1934 | Parker |

(Continued)

FOREIGN PATENT DOCUMENTS

| | | | |
|---|---|---|---|
| BR | 102016021809 | A2 | 6/2020 |
| CN | 1599851 | A | 3/2005 |

(Continued)

OTHER PUBLICATIONS

Extended European Search Report in European Patent Application No. 10821191.3 issued Sep. 20, 2013.

(Continued)

*Primary Examiner* — Binh Q Tran
(74) *Attorney, Agent, or Firm* — Foley & Lardner LLP

(57) ABSTRACT

A decomposition chamber for an aftertreatment system includes an inlet conduit, a decomposition conduit, an endcap, an injector, a guide swirl mixer, and a baffle. The inlet conduit is configured to receive exhaust and includes an inlet conduit exit opening. The decomposition conduit is coupled to the inlet conduit. The endcap is coupled to the decomposition conduit. The injector is coupled to the endcap and configured to provide reductant into the decomposition conduit along an injection axis. The baffle is coupled to the endcap and separated from the guide swirl mixer such that (i) at least a portion of the baffle extends around at least a portion of the guide swirl mixer; and (ii) at least a portion of the baffle extends between the inlet conduit exit opening and at least a portion of the guide swirl mixer.

20 Claims, 11 Drawing Sheets

(56) References Cited

U.S. PATENT DOCUMENTS

| | | | |
|---|---|---|---|
| 2,269,664 A | | 1/1942 | Hallerberg |
| 3,265,413 A | | 8/1966 | Currie |
| 3,432,189 A | | 3/1969 | Buller |
| 3,498,649 A | | 3/1970 | Pfeuffer |
| 3,820,831 A | | 6/1974 | Swedelius |
| 3,865,413 A | | 2/1975 | Mizusawa et al. |
| 3,964,773 A | | 6/1976 | Stade et al. |
| 3,985,377 A | | 10/1976 | Ahola et al. |
| 4,071,269 A | | 1/1978 | Halling et al. |
| 4,111,778 A | | 9/1978 | Davis et al. |
| 4,209,177 A | | 6/1980 | Hall |
| 4,248,833 A | | 2/1981 | Aoyama |
| 4,534,213 A | | 8/1985 | Mirikidani |
| 4,693,502 A | | 9/1987 | Oetiker |
| 4,832,380 A | | 5/1989 | Oetiker |
| 4,851,015 A | | 7/1989 | Wagner et al. |
| 5,009,065 A | | 4/1991 | Howe |
| 5,285,640 A | | 2/1994 | Olivo |
| 5,339,630 A | * | 8/1994 | Pettit ..................... F01N 3/2033 60/303 |
| 5,355,973 A | | 10/1994 | Wagner |
| 5,403,557 A | | 4/1995 | Harris |
| 5,505,498 A | | 4/1996 | Halling et al. |
| 5,521,339 A | | 5/1996 | Despain et al. |
| 5,661,976 A | | 9/1997 | Clanton |
| 5,961,313 A | | 10/1999 | Haumann et al. |
| 6,152,453 A | | 11/2000 | Kashima et al. |
| 6,158,214 A | | 12/2000 | Kempka et al. |
| 6,164,067 A | | 12/2000 | Cronje |
| 6,220,021 B1 | | 4/2001 | Frederiksen |
| 6,401,449 B1 | | 6/2002 | Hofmann et al. |
| 6,632,406 B1 | | 10/2003 | Michelin et al. |
| 6,651,773 B1 | | 11/2003 | Marocco |
| 6,722,123 B2 | | 4/2004 | Liu et al. |
| 6,729,127 B2 | | 5/2004 | Woerner et al. |
| 6,732,509 B2 | | 5/2004 | Shiga |
| 6,843,104 B2 | | 1/2005 | Busch |
| 6,976,397 B2 | | 12/2005 | Widmer |
| 7,104,358 B2 | | 9/2006 | Frederiksen |
| 7,172,202 B2 | | 2/2007 | Kubota et al. |
| 7,273,592 B2 | | 9/2007 | Jacob et al. |
| 7,393,020 B2 | | 7/2008 | Hartig et al. |
| 7,399,005 B2 | | 7/2008 | Rigollet et al. |
| 7,415,901 B2 | | 8/2008 | Desrochers et al. |
| 7,430,855 B2 | | 10/2008 | Amemiya et al. |
| 7,533,520 B2 | | 5/2009 | Cheng et al. |
| 7,582,267 B1 | | 9/2009 | Klein et al. |
| 7,665,797 B1 | | 2/2010 | Brosseau |
| 8,079,211 B2 | | 12/2011 | Levin et al. |
| 8,114,364 B2 | | 2/2012 | Harinath et al. |
| 8,220,253 B2 | | 7/2012 | Werni et al. |
| 8,240,137 B2 | | 8/2012 | Liu et al. |
| 8,328,243 B2 | | 12/2012 | Matthis et al. |
| 8,341,936 B2 | | 1/2013 | Zhang |
| 8,342,159 B2 | | 1/2013 | Detore |
| 8,371,109 B2 | | 2/2013 | Endo et al. |
| 8,393,147 B2 | | 3/2013 | Gerges |
| 8,402,752 B2 | * | 3/2013 | Kowada ................ F01N 13/009 60/295 |
| 8,528,319 B2 | | 9/2013 | Wilhelm et al. |
| 8,580,003 B2 | | 11/2013 | Mitsuda |
| 8,789,363 B2 | | 7/2014 | Iverson et al. |
| 8,991,160 B2 | | 3/2015 | Katou et al. |
| 9,010,096 B2 | | 4/2015 | Golin et al. |
| 9,103,252 B2 | | 8/2015 | Golin et al. |
| 9,163,589 B2 | | 10/2015 | Jeanson et al. |
| 9,217,348 B2 | | 12/2015 | Kimura |
| 9,221,016 B2 | | 12/2015 | Van Niekerk et al. |
| 9,346,790 B2 | | 5/2016 | Alvaro et al. |
| 9,352,276 B2 | | 5/2016 | Sampath |
| 9,410,464 B2 | | 8/2016 | Hicks et al. |
| 9,435,240 B2 | | 9/2016 | Sampath et al. |
| 9,528,415 B2 | | 12/2016 | Brandl et al. |
| 9,556,781 B2 | | 1/2017 | Ludeman et al. |
| 9,593,618 B2 | | 3/2017 | Runde et al. |
| 9,790,832 B2 | | 10/2017 | Mitsuda |
| 9,849,424 B2 | | 12/2017 | Davidson et al. |
| 9,909,698 B2 | | 3/2018 | Drost et al. |
| 9,982,584 B2 | | 5/2018 | Püschel et al. |
| 10,188,994 B2 | | 1/2019 | Tyni et al. |
| 10,247,081 B2 | | 4/2019 | Niaz |
| 10,273,853 B2 | | 4/2019 | Golin |
| 10,273,855 B2 | | 4/2019 | Noren et al. |
| 10,287,948 B1 | | 5/2019 | Moulieres et al. |
| 10,422,268 B2 | | 9/2019 | Niaz |
| 10,493,410 B2 | | 12/2019 | Muruganantham et al. |
| 10,583,393 B2 | | 3/2020 | Valentine et al. |
| 10,612,443 B2 | | 4/2020 | Li et al. |
| 10,787,946 B2 | | 9/2020 | Rohde et al. |
| 10,883,405 B1 | | 1/2021 | Hornback et al. |
| 10,900,596 B2 | | 1/2021 | Drost et al. |
| 10,920,635 B2 | | 2/2021 | Kozakiewicz |
| 10,920,642 B2 | | 2/2021 | Wang et al. |
| 10,927,743 B2 | | 2/2021 | Jang |
| 10,933,387 B2 | | 3/2021 | Cvelbar |
| 10,940,435 B2 | | 3/2021 | Valencia Arcila et al. |
| 10,967,334 B2 | | 4/2021 | Quan et al. |
| 11,193,412 B2 | | 12/2021 | Cvelbar et al. |
| 11,293,328 B2 | | 4/2022 | Cvelbar et al. |
| 11,428,139 B2 | | 8/2022 | Lu et al. |
| 11,459,929 B2 | | 10/2022 | Dimpelfeld et al. |
| 2004/0040782 A1 | | 3/2004 | Frederiksen |
| 2004/0075276 A1 | | 4/2004 | Lemke et al. |
| 2004/0099475 A1 | | 5/2004 | Schulte |
| 2004/0109795 A1 | | 6/2004 | Marc |
| 2006/0053779 A1 | | 3/2006 | Belisle et al. |
| 2006/0082154 A1 | | 4/2006 | Hartig et al. |
| 2007/0039316 A1 | | 2/2007 | Bosanec et al. |
| 2007/0101703 A1 | | 5/2007 | Kanaya et al. |
| 2007/0214862 A1 | | 9/2007 | Kubinski et al. |
| 2008/0041043 A1 | | 2/2008 | Andersen |
| 2008/0093421 A1 | | 4/2008 | Forster et al. |
| 2008/0277016 A1 | | 11/2008 | Covers et al. |
| 2009/0007551 A1 | | 1/2009 | Wahlstrom et al. |
| 2009/0145689 A1 | | 6/2009 | Han |
| 2009/0165447 A1 | | 7/2009 | Hiranuma et al. |
| 2009/0180937 A1 | | 7/2009 | Nohl et al. |
| 2009/0266644 A1 | | 10/2009 | Price |
| 2010/0064662 A1 | | 3/2010 | Hinz et al. |
| 2010/0107614 A1 | | 5/2010 | Levin et al. |
| 2010/0139258 A1 | | 6/2010 | Hackett et al. |
| 2010/0146942 A1 | | 6/2010 | Mayr et al. |
| 2010/0187771 A1 | | 7/2010 | Waltenberg et al. |
| 2010/0196225 A1 | | 8/2010 | Harinath et al. |
| 2010/0212292 A1 | | 8/2010 | Rusch et al. |
| 2010/0263359 A1 | | 10/2010 | Haverkamp et al. |
| 2010/0319329 A1 | | 12/2010 | Khadiya |
| 2011/0030343 A1 | | 2/2011 | Kiser et al. |
| 2011/0094206 A1 | | 4/2011 | Liu et al. |
| 2011/0099978 A1 | | 5/2011 | Davidsin et al. |
| 2011/0107743 A1 | | 5/2011 | Ranganathan et al. |
| 2011/0113759 A1 | | 5/2011 | Tilinski et al. |
| 2011/0131958 A1 | | 6/2011 | Adelman et al. |
| 2011/0142723 A1 | | 6/2011 | Yamamoto |
| 2011/0146253 A1 | | 6/2011 | Isada et al. |
| 2011/0146254 A1 | | 6/2011 | Yi et al. |
| 2011/0167805 A1 | | 7/2011 | Chen |
| 2011/0180347 A1 | | 7/2011 | Butler |
| 2012/0090305 A1 | | 4/2012 | Floyd et al. |
| 2012/0102920 A1 | | 5/2012 | Pipis, Jr. |
| 2012/0174561 A1 | | 7/2012 | Troxler et al. |
| 2012/0324872 A1 | | 12/2012 | Jaruvatee et al. |
| 2013/0031891 A1 | | 2/2013 | Ponnathpur |
| 2013/0047605 A1 | | 2/2013 | Drangel et al. |
| 2013/0061577 A1 | | 3/2013 | Floyd et al. |
| 2013/0156652 A1 | | 6/2013 | Kamei et al. |
| 2013/0164182 A1 | * | 6/2013 | Iijima ................... F01N 3/2066 261/76 |
| 2013/0167516 A1 | | 7/2013 | Loman |
| 2013/0276438 A1 | * | 10/2013 | De Rudder ............. B01F 25/10 60/324 |
| 2013/0340417 A1 | | 12/2013 | Morey et al. |
| 2014/0007562 A1 | | 1/2014 | Justin |
| 2014/0137382 A1 | | 5/2014 | Stonecipher |

(56) References Cited

U.S. PATENT DOCUMENTS

| | | | | |
|---|---|---|---|---|
| 2014/0196440 | A1* | 7/2014 | Katou | B01F 25/102 60/286 |
| 2014/0230411 | A1 | 8/2014 | De Rudder et al. | |
| 2014/0238000 | A1 | 8/2014 | Olivier | |
| 2014/0271386 | A1 | 9/2014 | Stanavich | |
| 2014/0325967 | A1 | 11/2014 | Kimura | |
| 2015/0040537 | A1 | 2/2015 | Hicks et al. | |
| 2015/0071826 | A1 | 3/2015 | Sampath et al. | |
| 2015/0071828 | A1 | 3/2015 | Sampath et al. | |
| 2015/0101318 | A1 | 4/2015 | Munnannur et al. | |
| 2015/0218996 | A1 | 8/2015 | Brandl et al. | |
| 2015/0226368 | A1 | 8/2015 | Schellin et al. | |
| 2015/0233276 | A1 | 8/2015 | Cassity et al. | |
| 2016/0006111 | A1 | 1/2016 | Miskovsk et al. | |
| 2016/0047288 | A1 | 2/2016 | Arrowsmith et al. | |
| 2016/0084133 | A1 | 3/2016 | Sampath et al. | |
| 2016/0129397 | A1 | 5/2016 | Lee et al. | |
| 2016/0215673 | A1 | 7/2016 | Noren et al. | |
| 2016/0326931 | A1 | 11/2016 | Freeman et al. | |
| 2016/0341083 | A1 | 11/2016 | Matsunaga et al. | |
| 2017/0074133 | A1 | 3/2017 | Reichelt et al. | |
| 2017/0082007 | A1 | 3/2017 | Alano et al. | |
| 2017/0089249 | A1 | 3/2017 | Neumann et al. | |
| 2017/0152782 | A1* | 6/2017 | Petry | F01N 3/2892 |
| 2017/0342888 | A1 | 11/2017 | Noren et al. | |
| 2017/0361273 | A1 | 12/2017 | Zoran et al. | |
| 2017/0370262 | A1 | 12/2017 | Zoran et al. | |
| 2018/0058291 | A1 | 3/2018 | Bugos et al. | |
| 2018/0078912 | A1 | 3/2018 | Yadav et al. | |
| 2018/0080362 | A1 | 3/2018 | Kasai et al. | |
| 2018/0363530 | A1 | 12/2018 | Caulkins et al. | |
| 2019/0101037 | A1 | 4/2019 | Golin | |
| 2020/0047136 | A1 | 2/2020 | Kurpejovic et al. | |
| 2020/0123955 | A1 | 4/2020 | Liu et al. | |
| 2020/0206700 | A1 | 7/2020 | Seal et al. | |
| 2020/0269189 | A1 | 8/2020 | Alano et al. | |
| 2020/0376450 | A1 | 12/2020 | Poinsot et al. | |
| 2021/0039056 | A1 | 2/2021 | De Rudder et al. | |
| 2021/0095587 | A1 | 4/2021 | Cvelbar et al. | |
| 2021/0095588 | A1 | 4/2021 | Gandikota et al. | |
| 2021/0148275 | A1 | 5/2021 | Hiraoka | |
| 2021/0270174 | A1 | 9/2021 | Volmerding et al. | |
| 2021/0285356 | A1 | 9/2021 | Tan et al. | |
| 2021/0301710 | A1 | 9/2021 | Cvelbar et al. | |
| 2021/0308635 | A1 | 10/2021 | Mayer et al. | |
| 2021/0340896 | A1* | 11/2021 | Albert | B01F 23/2132 |
| 2021/0348538 | A1 | 11/2021 | Aru et al. | |
| 2021/0388751 | A1 | 12/2021 | Cvelbar et al. | |
| 2021/0404367 | A1 | 12/2021 | Alano et al. | |
| 2022/0090531 | A1 | 3/2022 | Cvelbar et al. | |
| 2022/0162974 | A1 | 5/2022 | Cvelbar et al. | |
| 2022/0162975 | A1 | 5/2022 | Cvelbar et al. | |
| 2022/0162976 | A1 | 5/2022 | Alano et al. | |
| 2022/0178293 | A1 | 6/2022 | Lu et al. | |
| 2022/0184567 | A1 | 6/2022 | Geant | |
| 2022/0341357 | A1 | 10/2022 | Chauvin et al. | |
| 2023/0003158 | A1 | 1/2023 | Pandit et al. | |
| 2023/0065989 | A1 | 3/2023 | Geant et al. | |
| 2024/0209765 | A1* | 6/2024 | Kotimäki | F01N 3/2066 |

FOREIGN PATENT DOCUMENTS

| | | | |
|---|---|---|---|
| CN | 103573351 | B | 2/2014 |
| CN | 205025535 | U | 2/2016 |
| CN | 106232955 | A | 12/2016 |
| CN | 107035497 | A | 8/2017 |
| CN | 107956568 | | 4/2018 |
| CN | 108374708 | A | 8/2018 |
| CN | 207813720 | U | 9/2018 |
| CN | 208106533 | U | 11/2018 |
| CN | 110761876 | A | 2/2020 |
| CN | 210195855 | U | 3/2020 |
| CN | 210686097 | U | 6/2020 |
| CN | 210829445 | U | 6/2020 |
| CN | 210858886 | U | 6/2020 |
| CN | 211082028 | U | 7/2020 |
| CN | 211116205 | U | 7/2020 |
| CN | 211314342 | U | 8/2020 |
| CN | 211397693 | U | 9/2020 |
| CN | 211573625 | U | 9/2020 |
| CN | 211737255 | U | 10/2020 |
| CN | 212130586 | U | 12/2020 |
| CN | 212130587 | U | 12/2020 |
| CN | 112196645 | | 1/2021 |
| CN | 112282900 | | 1/2021 |
| CN | 212671904 | U | 3/2021 |
| CN | 214836650 | U | 11/2021 |
| CN | 214887318 | U | 11/2021 |
| CN | 215109110 | U | 12/2021 |
| CN | 215292631 | U | 12/2021 |
| CN | 215486219 | U | 1/2022 |
| CN | 216617626 | U | 5/2022 |
| CN | 217872989 | U | 11/2022 |
| DE | 10203310 | A1 | 7/2003 |
| DE | 10348175 | A1 | 5/2004 |
| DE | 10 2008 018 063 | A1 | 11/2008 |
| DE | 10 2008 043 408 | A1 | 5/2010 |
| DE | 10 2009 036 511 | A1 | 2/2011 |
| DE | 10 2015 218 503 | A1 | 3/2017 |
| DE | 10 2018 107 690 | A1 | 10/2019 |
| DE | 10 2020 128 226 | B3 | 9/2021 |
| EP | 0 556 846 | A1 | 8/1993 |
| EP | 0 931 913 | A1 | 7/1999 |
| EP | 0 978 721 | A1 | 2/2000 |
| EP | 1 748 162 | A1 | 1/2007 |
| EP | 3 147 472 | A1 | 3/2017 |
| FR | 2290580 | | 6/1976 |
| FR | 2867511 | A1 | 9/2005 |
| FR | 2906864 | A1 | 4/2008 |
| FR | 3102684 | B1 | 11/2021 |
| FR | 3102683 | B1 | 6/2022 |
| GB | 2 448 993 | B | 11/2008 |
| GB | 2 539 711 | | 12/2016 |
| JP | H09-133276 | A | 5/1997 |
| JP | 2006-009914 | A | 1/2006 |
| JP | 2009-150338 | A | 7/2009 |
| JP | 2009-167965 | A | 7/2009 |
| JP | 2017-075596 | A | 4/2017 |
| KR | 10-0776367 | B1 | 11/2007 |
| KR | 10-0904419 | A | 6/2009 |
| KR | 20150099893 | A | 9/2015 |
| WO | WO-2011/041448 | A2 | 4/2011 |
| WO | WO-2011/126930 | A2 | 10/2011 |
| WO | WO-2011/163395 | A1 | 12/2011 |
| WO | WO-2013/025860 | A1 | 2/2013 |
| WO | WO-2016/154316 | | 9/2016 |
| WO | WO-2017/053194 | A1 | 3/2017 |
| WO | WO-2018/040300 | | 3/2018 |
| WO | WO-2020/009694 | A1 | 1/2020 |
| WO | WO-2022/087279 | A1 | 4/2022 |
| WO | WO-2023/009127 | | 2/2023 |

OTHER PUBLICATIONS

Final Office Action in U.S. Appl. No. 12/893,959 issued Feb. 19, 2014.

First Examination Report in Indian Patent Application No. 3808/CHENP/2012 issued May 2, 2018.

First Office Action in Chinese Patent Application No. 201080053740.1 issued Nov. 20, 2013 (with translation).

First Office Action in Chinese Patent Application No. 201510152512.4 issued Jul. 25, 2016 (with translation).

International Search Report & Written Opinion in PCT Application No. PCT/US2024/013225 issued Jul. 11, 2024.

International Search Report & Written Opinion in PCT Application No. PCT/US2010/050771 issued Jun. 1, 2011.

International Search Report and Written Opinion for PCT Application No. PCT/US2023/028796, dated Oct. 19, 2023.

International Search Report and Written Opinion for PCT Application No. PCT/US2024/013225 issued Jul. 11, 24.

International Search Report and Written Opinion in PCT Application No. PCT/US2021/043753, issued Nov. 15, 2021.

(56) References Cited

OTHER PUBLICATIONS

Mack ClearTech One. [Video]. YouTube. https://www.youtube.com/watch?v=BG9cYO9uZI4 [Accessed Nov. 8, 2022].
Non-Final Office Action in U.S. Appl. No. 17/851,361 issued Mar. 28, 2024.
Office Action in U.S. Appl. No. 12/893,959 issued Aug. 10, 2012.
Office Action in U.S. Appl. No. 12/893,959 issued May 14, 2013.
Pre-Examination Opinion in Brazilian Patent Application No. 112012007072.0 issued Mar. 19, 2019.
Proventia, Improved SCR Performance with Effective Urea Mixing, https://www.proventia.com/emission_control/oem_emission_control_non-road/eat_systems_technologies/scr_and_urea_mixing (last accessed Mar. 22, 2022).
Star-CCM+, Droplets trajectories and velocities inside Proventia Tornado mixer, Nov. 12, 2019, https://www.youtube.com/watch?v=qMViqu8RYPs (Last accessed Mar. 22, 2022).
Dwyer, "Air Velocity Measurement," retrieved from https://www.dwyer-inst.com/products/airvelocityintroduction.cfm, 6 pages (2010).
Elnady, et al., "Investigation of the Acoustic Performance of After Treatment Devices," SAE International Journal of Passenger Cars—Mechanical Systems 42(2), pp. 1068-1075 (2011).
Extended European Search Report for European Patent Application. No. 13154457.9 dated May 7, 2013.
Final Office Action in U.S. Appl. No. 17/947,822 issued May 25, 2023.
Foreign Action other than Search Report in French Patent Application No. 2400263 Issued Apr. 8, 2024.
Foreign Search Report in French Patent Application No. 2213452 dated May 31, 2023.
Foreign Search Report in French Patent Application No. 2302689 dated Oct. 6, 2023.
Howard & Craig, "Adaptive-Passive Quarter-Wave Tube Resonator Silencer," Proceedings of Acoustics 2011, 64, 6 pages (2011).
International Search Report & Written Opinion for PCT/US2015/010837, dated May 6, 2015.
International Search Report & Written Opinion for PCT/US2018/040737, dated Sep. 7, 2018.
International Search Report and Written opinion for PCT/US2018/00259, dated Dec. 6, 2018.
International Search Report and Written Opinion in PCT/US2023/083072 dated Feb. 15, 2024.
International Search Report and Written Opinion in PCT/US2024/20901 issued Jul. 16, 2024.
Non-Final Office Action in U.S. Appl. No. 17/255,310 issued Mar. 7, 2022.
Non-Final Office Action in U.S. Appl. No. 17/947,822 issued Jan. 18, 2023.
Non-Final Office Action in U.S. Appl. No. 19/020,093 issued Feb. 20, 2026.
Non-Final Office Action in U.S. Appl. No. 19/048,740 issued Nov. 28, 2025.
Notice of Allowance in U.S. Appl. No. 19/020,093 issued May 8, 2026.
Office Action issued for U.S. Appl. No. 17/042,578 issued May 12, 2021.

* cited by examiner

DECOMPOSITION CHAMBER FOR AFTERTREATMENT SYSTEM

TECHNICAL FIELD

The present application relates generally to decomposition chambers for an aftertreatment system of an internal combustion engine.

BACKGROUND

Nitrogen oxide ($NO_x$) compounds are emitted in exhaust from internal combustion engines such as diesel engines. It is desirable to reduce $NO_x$ emissions to comply with environmental regulations, for example. To reduce $NO_x$ emissions, a reductant may be dosed into the exhaust by a dosing system and within an aftertreatment system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions. It is often desirable to facilitate mixing of the reductant and the exhaust. Flow of the reductant against internal surfaces of the aftertreatment system can result in deterioration of portions of these internal surfaces.

SUMMARY

A component of the aftertreatment system may facilitate a chemical reaction between the exhaust and the reductant by causing mixing of the exhaust and reductant. However, depending on its configuration, the component can cause decreases in performance and/or efficiency of an internal combustion engine associated with the aftertreatment system. For example, the component may be prone to corrosion and/or erosion, which can cause leakage of reductant.

Certain embodiments of the present disclosure may address these issues.

In one embodiment, a decomposition chamber for an aftertreatment system comprises an inlet conduit configured to receive exhaust, a decomposition conduit, an endcap, an injector, a guide swirl mixer, and a baffle. The inlet conduit includes an inlet conduit exit opening. The decomposition conduit is coupled to the inlet conduit. The endcap is coupled to the decomposition conduit. The injector is coupled to the endcap and configured to provide reductant into the decomposition conduit along an injection axis. The guide swirl mixer is coupled to the endcap such that at least a portion of the guide swirl mixer extends partially around the injection axis. The baffle is coupled to the endcap and separated from the endcap from the guide swirl mixer such that: (i) at least a portion of the baffle extends around at least a portion of the guide swirl mixer; and (ii) at least a portion of the baffle extends between the inlet conduit exit opening and at least a portion of the guide swirl mixer.

In one embodiment, the inlet conduit is centered on an inlet conduit axis. The decomposition conduit is centered on a decomposition conduit axis. The inlet conduit axis is orthogonal to the decomposition conduit axis.

In one embodiment, which is combinable with any of the above-described embodiments, the endcap is disposed along a plane. The baffle has a length in a direction orthogonal to the plane. The length is between 5 millimeters and 40 millimeters.

In one embodiment, which is combinable with any of the above-described embodiments, the baffle extends in a direction that is parallel to the inlet conduit axis.

In one embodiment, which is combinable with any of the above-described embodiments, the baffle is coupled to the endcap such that the decomposition conduit axis extends through the baffle.

In one embodiment, which is combinable with any of the above-described embodiments, the baffle is coupled to the endcap such that the injection axis extends through the baffle.

In one embodiment, which is combinable with any of the above-described embodiments, the baffle extends entirely around the decomposition conduit axis.

In one embodiment, which is combinable with any of the above-described embodiments, the baffle is ring shaped.

In one embodiment, which is combinable with any of the above-described embodiments, the endcap is disposed along a plane. The baffle has a first length in a direction orthogonal to the plane. The guide swirl mixer has a second length in the direction. The second length is greater than the first length.

In one embodiment, which is combinable with any of the above-described embodiments, the guide swirl mixer further includes a first edge at which the guide swirl mixer is coupled, a second edge, a third edge, a flat segment, and a curved segment. The second edge extends from the first edge in a direction away from the endcap, the second edge is located on an inlet conduit side of the injection axis. The third edge extends from the first edge in a direction away from the endcap, the third edge is on a side opposite the inlet conduit side of the injection axis. The flat segment extends from the second edge. The curved segment curves only partially around the injection axis and extends from the flat segment to the third edge. The baffle is separated from the flat segment by a first distance. The baffle is separated from the curved segment by a second distance. The first distance is greater than the second distance.

In one embodiment, which is combinable with any of the above-described embodiments, the guide swirl mixer further includes a first edge at which the guide swirl mixer is coupled, a second edge, a third edge, a flat segment, and a curved segment. The second edge extends from the first edge in a direction away from the endcap, the second edge is located on an inlet conduit side of the injection axis. The third edge extends from the first edge in a direction away from the endcap, the third edge is on a side opposite the inlet conduit side of the injection axis. The flat segment extends from the second edge. The curved segment curves only partially around the injection axis and extends from the flat segment to the third edge. The baffle is separated from the flat segment by a first distance. The baffle is separated from the curved segment by a second distance. The first distance is less than the second distance.

In one embodiment, which is combinable with any of the above-described embodiments, the guide swirl mixer further includes a first edge at which the guide swirl mixer is coupled, a second edge, a third edge, a flat segment, and a curved segment. The second edge extends from the first edge in a direction away from the endcap, the second edge is located on an inlet conduit side of the injection axis. The third edge extends from the first edge in a direction away from the endcap, the third edge is on a side opposite the inlet conduit side of the injection axis. The flat segment extends from the second edge. The curved segment curves only partially around the injection axis and extends from the flat segment to the third edge. The baffle is separated from the flat segment by a first distance. The baffle is separated from the curved segment by a second distance. The first distance is equal to the second distance.

In one embodiment, which is combinable with any of the above-described embodiments, the guide swirl mixer includes a slot contiguous with the endcap. At least a portion of the baffle overlaps at least a portion of the slot when viewed in a direction parallel to an inlet conduit axis of the inlet conduit.

In one embodiment, which is combinable with any of the above-described embodiments, the guide swirl mixer further comprises a plate contiguous with the slot, the plate extending radially outward away from the injection axis. At least a portion of the baffle overlaps at least a portion of the plate when viewed in the direction.

In one embodiment, which is combinable with any of the above-described embodiments, the baffle is separated from the slot by a first distance. The baffle is separated from the plate by a second distance. The first distance is greater than the second distance.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing decomposing chambers in an aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that contains constituents such as $NO_x$, $N_2$, $CO_2$, and/or $H_2O$. In some applications, an aftertreatment system is utilized to dose the exhaust with a reductant so as to reduce $NO_x$ emissions in the exhaust. These aftertreatment systems may include a decomposition chamber within which the reductant is provided and mixed with the exhaust.

Enhancing mixing of the reductant and exhaust can increase reduction of the $NO_x$ emissions and therefore increase desirability of an aftertreatment system. However, a high exhaust velocity, may cause high levels of shear stress on one or more decomposition chamber components. High shear stress during mixing may have negative impacts on the decomposition chamber components (e.g., deterioration, etc.).

It is thus desirable to provide a decomposition chamber with a component configured to protect other decomposition chamber components from the impacts of high shear stress. A decomposition chamber is provided with an inlet conduit configured to receive exhaust and a decomposition conduit. The decomposition chamber includes a guide swirl mixer configured to concentrate exhaust prior to exhaust being provided to the decomposition conduit. The decomposition chamber includes a baffle configured to protect the guide swirl mixer from the effects of the high shear stress from the exhaust.

II. Example Aftertreatment System

Figure 1:
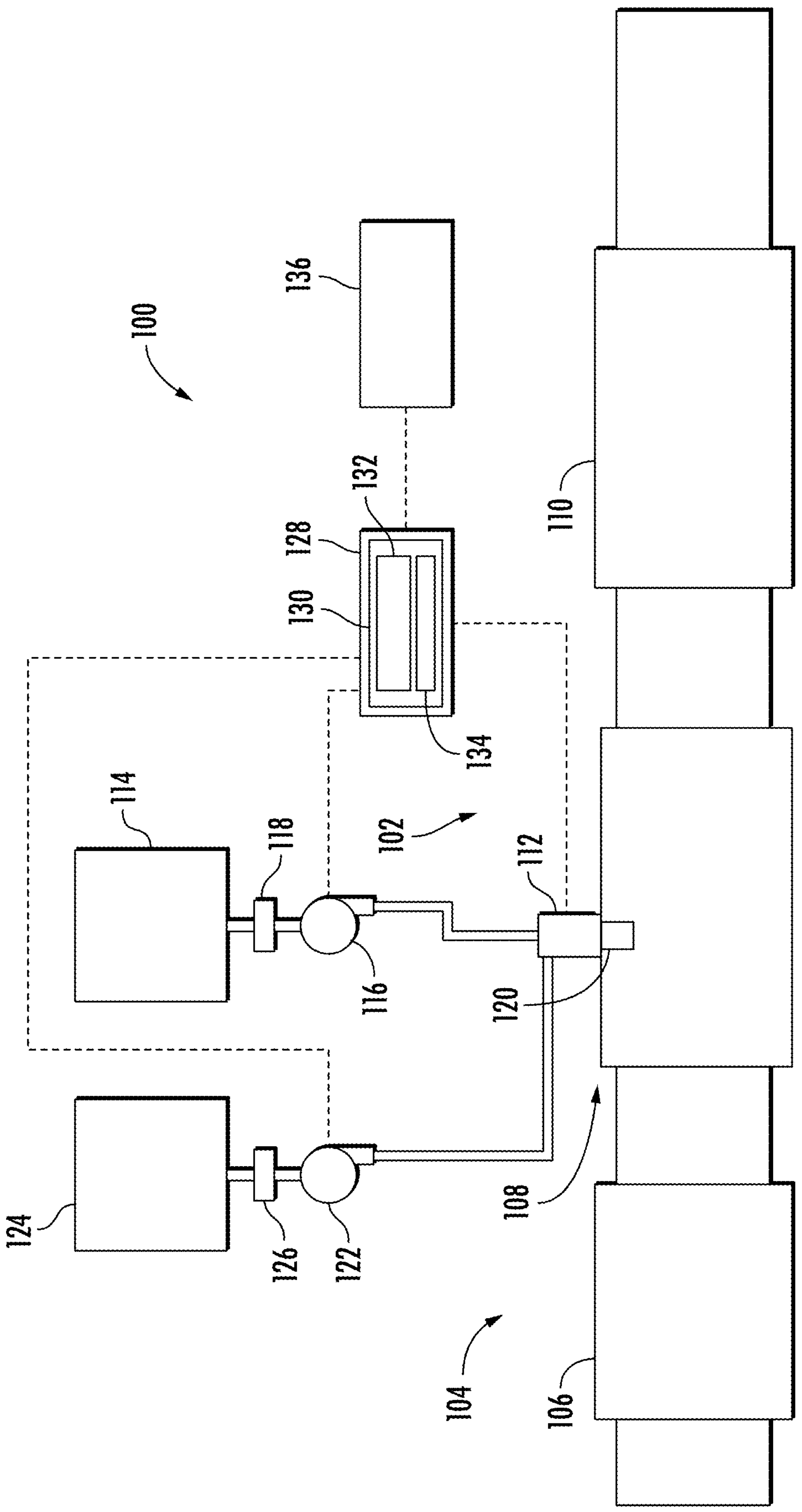
FIG. 1 is a block diagram of an example aftertreatment system.

FIG. 1 depicts an aftertreatment system 100 having an example reductant delivery system 102 for an exhaust conduit system 104 (e.g., pipe system, tube system, etc.). The aftertreatment system 100 includes the reductant delivery system 102, a particulate filter 106 (e.g., a diesel particulate filter (DPF), etc.), a decomposition chamber 108 (e.g., decomposition reactor, reactor pipe, decomposition tube, reactor tube, etc.), and a selective catalytic reduction (SCR) catalyst member 110.

The particulate filter 106 is configured to remove particulate matter, such as soot, from exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 108 includes an inlet fluidly coupled to (e.g., fluidly configured to communicate with, etc.) the particulate filter 106 to receive the exhaust containing $NO_x$ emissions and an outlet for the exhaust, $NO_x$ emissions, ammonia, and/or reductant to flow to the SCR catalyst member 110.

The reductant delivery system 102 includes a dosing module 112 (e.g., doser, etc.) configured to dose the reductant into the decomposition chamber 108 (e.g., via an injector). The dosing module 112 is mounted to the decomposition chamber 108 such that the dosing module 112 may dose the reductant into the exhaust flowing in the exhaust conduit system 104. The dosing module 112 may include an insulator interposed between a portion of the dosing module 112 and the portion of the decomposition chamber 108 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate (e.g., allow, permit, etc.) prolonged desirable operation of the reductant pump 116. In some embodiments, the reductant pump 116 is coupled to (e.g., attached to, fixed to, welded to, integrated with, etc.) a chassis of a vehicle associated with the aftertreatment system 100.

The dosing module 112 includes at least one injector 120. Each injector 120 is configured to dose the reductant into the exhaust (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU)), engine control module (ECM), etc.) of an internal combustion engine having the aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst member 110. As a result, the reductant is injected by the injector 120 upstream of the SCR catalyst member 110 such that the SCR catalyst member 110 receives a mixture of the reductant and exhaust. The reductant droplets undergo the processes of evaporation, thermolysis, and hydrolysis to form non-$NO_x$ emissions (e.g., gaseous ammonia, etc.) within the decomposition chamber 108 and/or the exhaust conduit system 104.

The SCR catalyst member 110 is configured to assist in the reduction of $NO_x$ emissions by accelerating a $NO_x$ reduction process between the reductant and the $NO_x$ of the exhaust into diatomic nitrogen, water, and/or carbon dioxide. The SCR catalyst member 110 includes an inlet fluidly coupled to the decomposition chamber 108 from which exhaust and reductant are received and an outlet fluidly coupled to an end of the exhaust conduit system 104.

The aftertreatment system 100 may further include an oxidation catalyst (e.g., a diesel oxidation catalyst (DOC)) fluidly coupled to the exhaust conduit system 104 (e.g., downstream of the SCR catalyst member 110 or upstream of the particulate filter 106) to oxidize hydrocarbons and carbon monoxide in the exhaust.

In some implementations, the particulate filter 106 may be positioned downstream of the decomposition chamber 108. For instance, the particulate filter 106 and the SCR catalyst member 110 may be combined into a single unit. In some implementations, the dosing module 112 may instead be positioned downstream of a turbocharger or upstream of a turbocharger.

While the aftertreatment system 100 has been shown and described in the context of use with a diesel internal combustion engine, it is understood that the aftertreatment system 100 may be used with other internal combustion engines, such as gasoline internal combustion engines, hybrid internal combustion engines, propane internal combustion engines, and other similar internal combustion engines.

III. Example Decomposition Chamber with Baffle

FIGS. 2-5 illustrate the decomposition chamber 108, according to an example embodiment. The decomposition chamber 108 includes an inlet assembly 200 (e.g., mixing assembly, etc.). As described in more detail herein, the inlet assembly 200 is configured to receive the exhaust and to facilitate mixing of the exhaust and reductant.

The decomposition chamber 108 includes an inlet fitting 202 (e.g., connector, coupling, section, etc.). The inlet fitting 202 is configured to receive exhaust from a portion of the exhaust conduit system 104 that is upstream of the decomposition chamber 108 and guide the exhaust into the decomposition chamber 108. For example, the inlet fitting 202 may receive the exhaust after the exhaust has flowed through the particulate filter 106. The inlet fitting 202 may be coupled to or integrally formed with, a portion of the exhaust conduit system 104. In some embodiments, the inlet fitting 202 comprises a flange that is configured to be coupled to a flange of an upstream conduit of the exhaust conduit system 104.

The inlet assembly 200 also includes an inlet conduit 204 (e.g., pipe, tube, etc.). the inlet conduit 204 is coupled to or integrally formed with the inlet fitting 202. The inlet conduit 204 is fluidly coupled to the inlet fitting 202 and configured to receive the exhaust from the inlet fitting 202. In various embodiments, the inlet fitting 202 and the inlet conduit 204 cooperate to facilitate the redirection of the exhaust from a first direction to a second direction different from the first direction.

The inlet conduit 204 is cylindrical in various embodiments. For example, the inlet conduit 204 may be cylindrical and have a diameter in a range of 30 mm to 200 mm, inclusive (e.g., 42 mm, 48 mm, 50 mm, 52 mm, 58 mm, 60 mm, 88.9 mm, 90 mm, 100 mm, 200 mmetc.).

Figure 2:
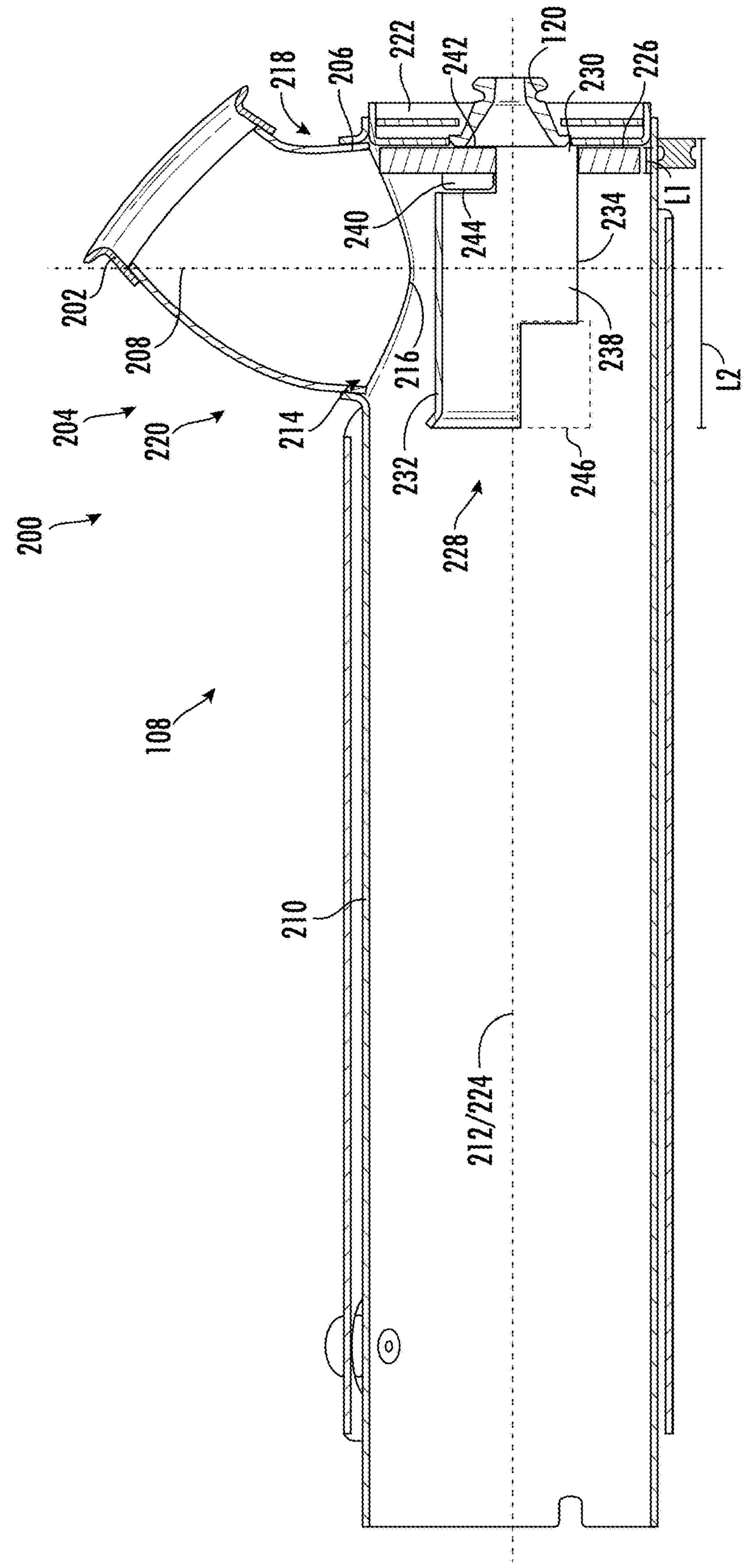
FIG. 2 is a cross-sectional view of a portion of an example decomposition chamber for an aftertreatment system.

In some embodiments, the inlet fitting 202 includes a first straight portion that is coupled to, or integrally formed with, the exhaust conduit system 104, and a curved portion that receives exhaust from the first straight portion, and a second straight portion that receives the exhaust from the curved portion and provides the exhaust to the inlet conduit 204. In some embodiments, the inlet conduit 204 may have multiple bends creating a “twisted” pipe. For example, the inlet conduit 204 may have a plurality of portions, each of which is angled relative to one of more adjacent portions. Each portion may be straight, curved, or a combination thereof. As shown in FIG. 2, the inlet fitting 202 includes at least a straight portion and an angled portion adjacent to the straight portion.

The inlet conduit 204 includes a straight portion 206 (e.g., a straight portion). The straight portion 206 is centered on an inlet conduit axis 208 (e.g., center line, etc.). A portion of the exhaust may be directed along the inlet conduit axis 208 and/or a direction parallel to the inlet conduit axis 208. As used herein, the term “axis” describes a theoretical line extending through the centroid (e.g., center of mass, etc.) of an object. The object is centered on this axis. The object is not necessarily cylindrical (e.g., a non-cylindrical shape may be centered on an axis, etc.).

The decomposition chamber 108 also includes a decomposition conduit 210. The decomposition conduit 210 is coupled to or integrally formed with the inlet conduit 204. For example, the inlet conduit 204 is coupled to a cylindrical surface of the decomposition conduit 210 in various embodiments. The decomposition conduit 210 is fluidly coupled to the inlet conduit 204 and is configured to receive the exhaust from the inlet conduit 204. As is explained in more detail herein, the decomposition conduit 210 facilitates the mixing of the exhaust and the reductant, and provision of the exhaust and reductant to the SCR catalyst member 110.

The decomposition conduit 210 is centered on a decomposition conduit axis 212 (e.g., center line, etc.). In some embodiments, the inlet conduit axis 208 is orthogonal to the decomposition conduit axis 212. In various embodiments, the decomposition conduit axis 212 intersects the inlet conduit axis 208 and the decomposition conduit axis 212 and the inlet conduit axis 208 extend along a reference plane. As a result, the exhaust does not flow tangentially from the inlet conduit 204 into the decomposition conduit 210. Additionally, the decomposition conduit axis 212 and the inlet conduit 204 are separated by an angular separation $\alpha$ measured along the reference plane. In various embodiments, the angular separation $\alpha$ is approximately equal to (e.g., equal to, within 5% of being equal to, etc.) 90 degrees (°) (e.g., 85.5°, 90°, 94.5°, etc.). In some embodiments, the angular separation $\alpha$ may be an angle in a range of 70 to 110 degrees) (°, inclusive (e.g., 75.5°, 90°, 105.5°, etc.). As a result, the exhaust may be caused to enter the decomposition conduit 210 along a direction that is approximately orthogonal to the decomposition conduit axis 212. As is explained in more detail herein, the inlet assembly 200 harnesses this redirection of the exhaust in order to enhance mixing of the exhaust and the reductant.

The decomposition conduit 210 is cylindrical in various embodiments. For example, the decomposition conduit 210 may be cylindrical and have a diameter in a range of 40 mm to 130 mm, inclusive (e.g., 58.5 mm, 70 mm, 114.3 mm, 130 mm, etc.). The decomposition conduit 210 may have a wall thickness in a range of 0.05 mm-3.00 mm, inclusive (e.g., 1.00 mm, 1.50 mm, etc.). In various embodiments, the decomposition conduit 210 is an ovalized pipe (e.g., a pipe with an oval cross-sectional shape, etc.) or has an elliptical cross-sectional shape. In some embodiments, the decomposition conduit 210 and the inlet conduit 204 are both cylindrical and the decomposition conduit 210 has a diameter in a range of a product of 1.2 and the diameter of the inlet conduit 204 to a product of 1.8 and the diameter of the inlet conduit 204, inclusive (e.g., a product of 1.4 and the diameter of the inlet conduit 204, etc.).

The straight portion 206 includes an inlet conduit exit opening 214 along which the inlet conduit 204 is coupled to the decomposition conduit 210. The inlet conduit exit opening 214 has a major diameter and a minor diameter that is smaller than the major diameter. In some embodiments, the inlet conduit exit opening 214 is configured such that the major diameter is in a range of 150% to 250%, inclusive, of the minor diameter. In some embodiments, the inlet conduit exit opening 214 is configured such that the major axis extends along the decomposition conduit axis 212 or is parallel to the decomposition conduit axis 212.

The inlet conduit exit opening 214 reduces backpressure of the component from the exhaust received from the inlet fitting 202 by being enlarged in the direction of the decomposition conduit axis 212. The reduction in the backpressure provided by the inlet conduit exit opening 214 may be used to compensate for increases in backpressure that would otherwise be provided by other components of the decomposition chamber 108. As a result, the inlet conduit exit opening 214 facilitates use of different configurations of the decomposition chamber 108 which may provide various advantages (e.g., reduced cost, increased uniformity index, etc.).

In various embodiments, the inlet conduit 204 has a variable cross-section along the inlet conduit axis 208. For example, the inlet conduit 204 may have a cross-sectional shape that gradually increases in size along the inlet conduit axis 208 at decreasing distances to the decomposition conduit 210. As a result, the inlet conduit 204 has a largest cross-sectional shape proximate the decomposition conduit 210. In one example, the opening formed at an inlet of the straight portion 206 is smaller than the opening formed at the inlet conduit exit opening 214.

The inlet conduit 204 further includes a lip 216 that extends around the inlet conduit exit opening 214, in some embodiments. The lip 216 is configured to be coupled to the decomposition conduit 210 around the inlet conduit exit opening 214. The lip 216 may form a flange along a perimeter of the inlet conduit exit opening 214. The lip 216 may be a saddle shape. The lip 216 may cooperate with the decomposition conduit 210 to form a seal between the inlet conduit 204 and the decomposition conduit 210.

The inlet conduit 204 includes an injector side 218 and an outlet side 220. The inlet conduit 204 extends between the injector side 218 and the outlet side 220. In some embodiments, a longest length of the inlet conduit 204 extends between the injector side 218 and the outlet side 220.

Figure 6:
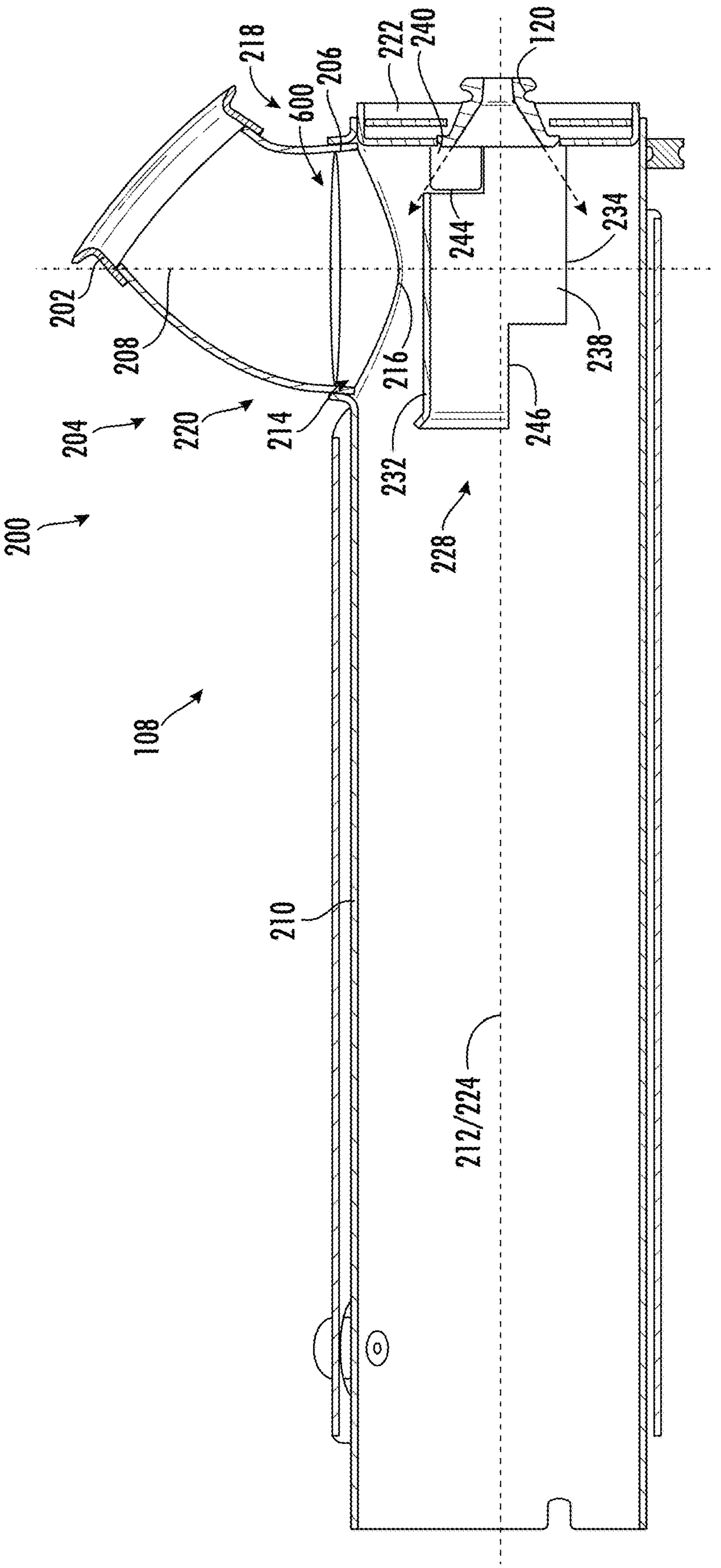
FIG. 6 is a cross-sectional view of a portion of another example decomposition chamber for an aftertreatment system.
Figure 7:
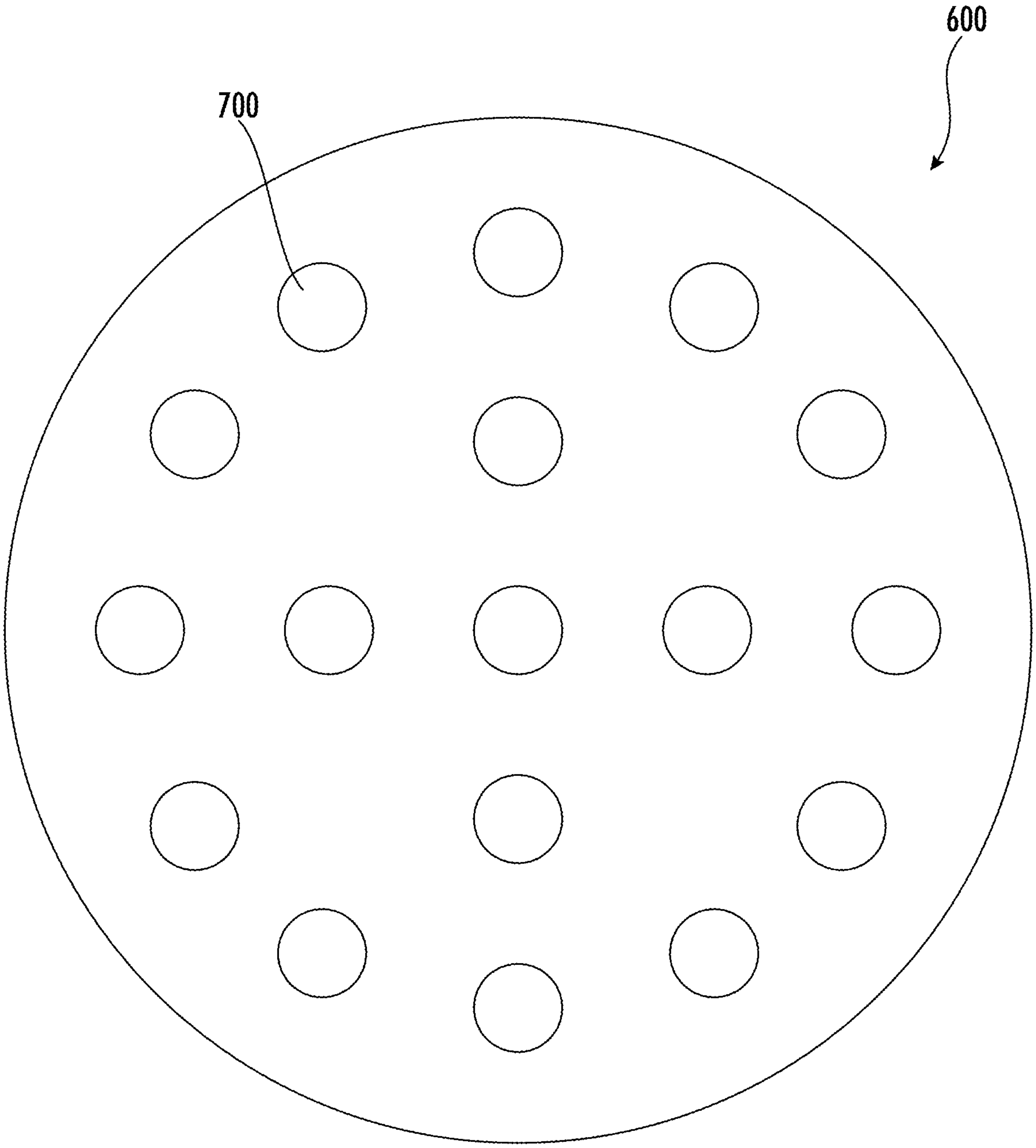
FIG. 7 is a front view of an example perforated plate for a decomposition chamber.
Figure 8:
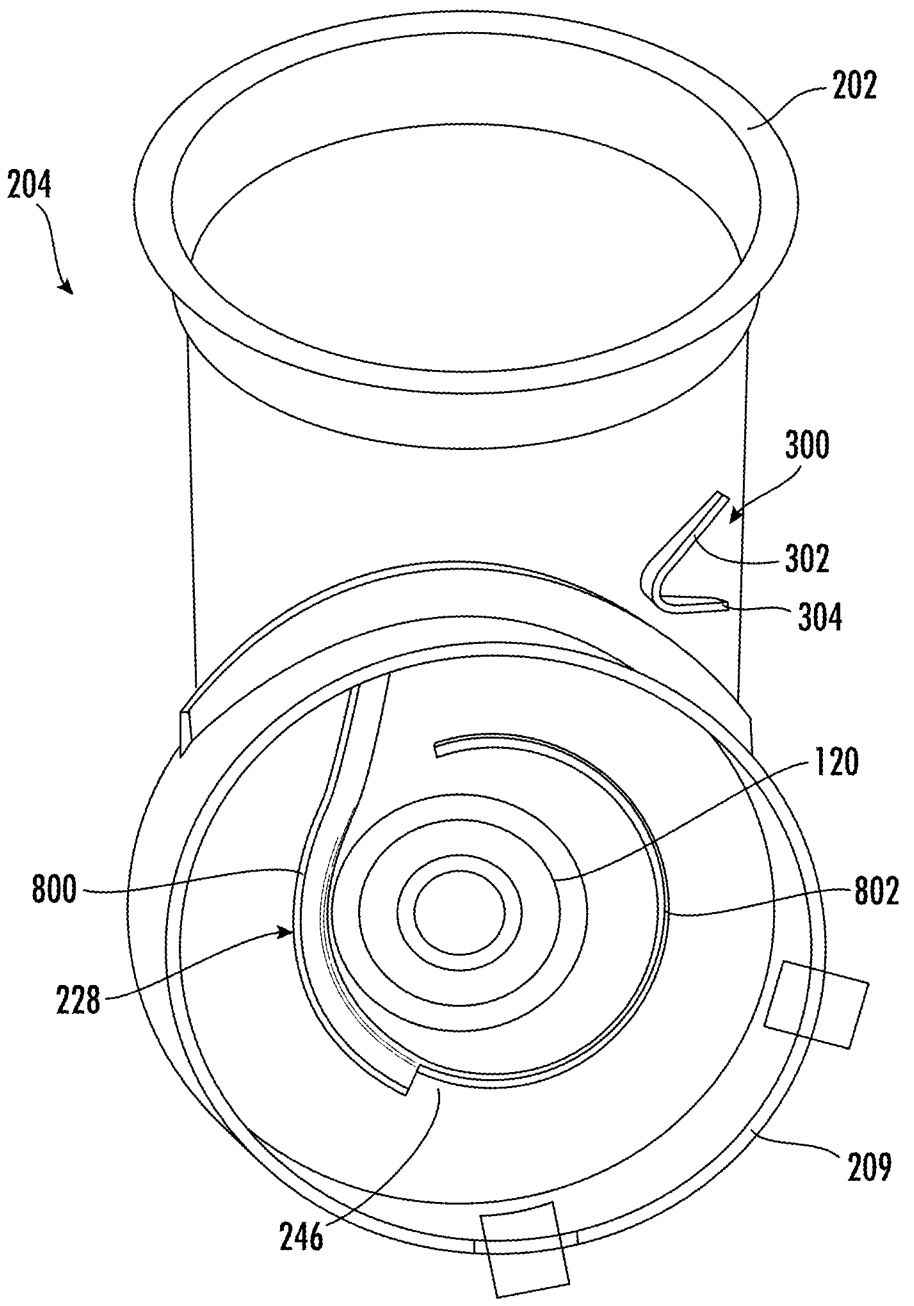
FIG. 8 is an end partial transparency view of a portion of another example decomposition chamber for an aftertreatment system.
Figure 9:
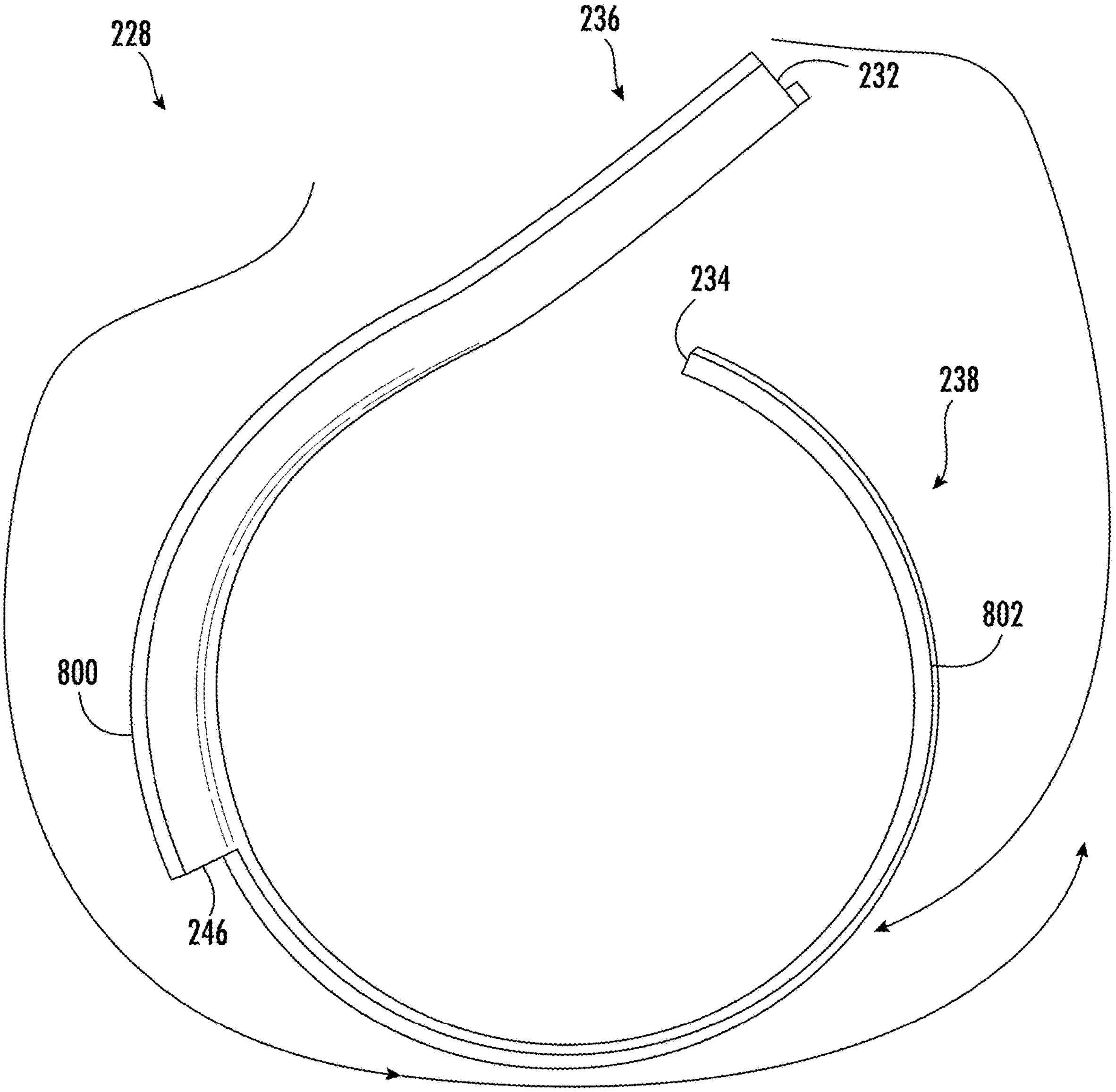
FIG. 9 is an end view of an example guide swirl mixer.
Figure 10:
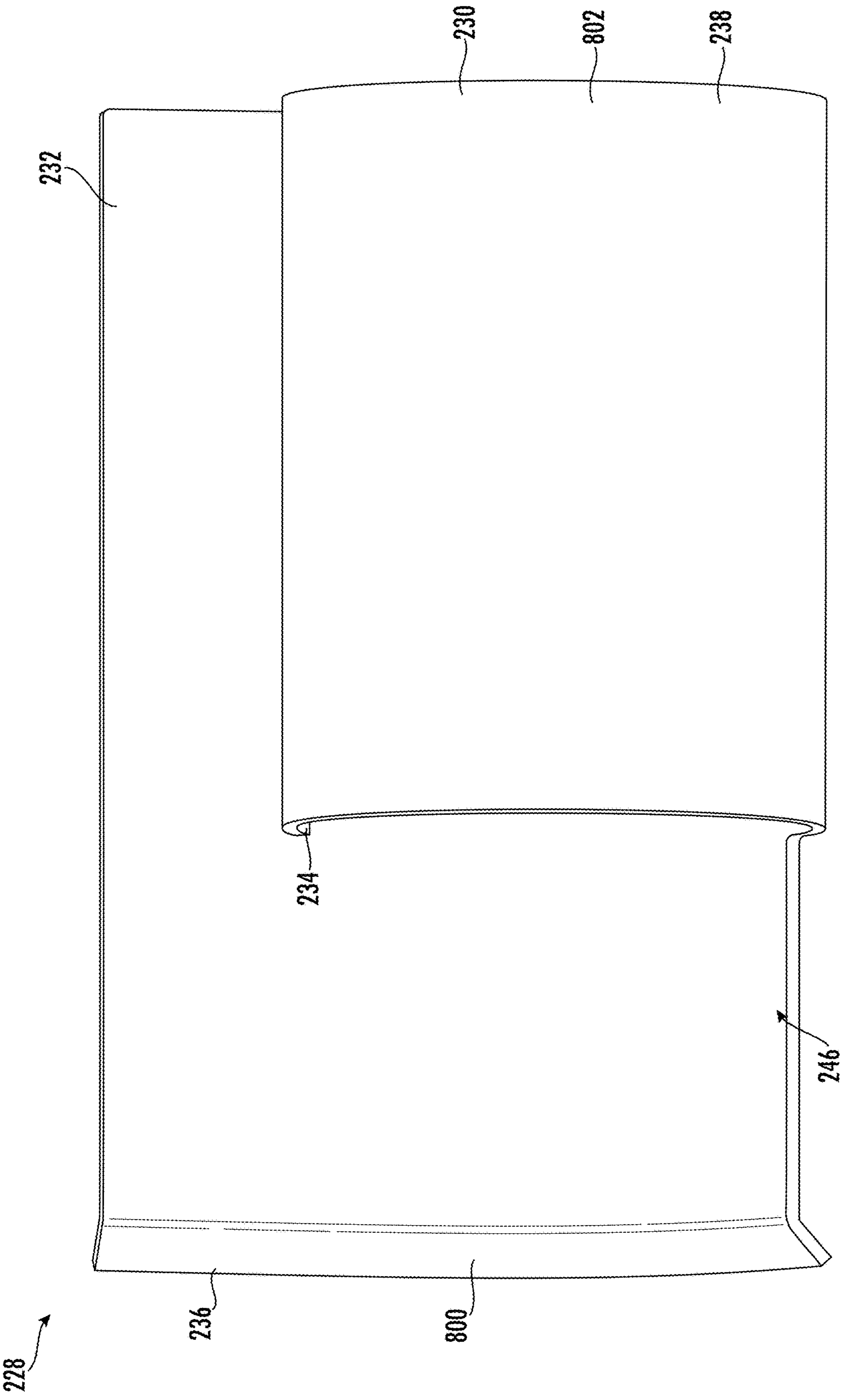
FIG. 10 is a cross-sectional view of an example guide swirl mixer.
Figure 11:
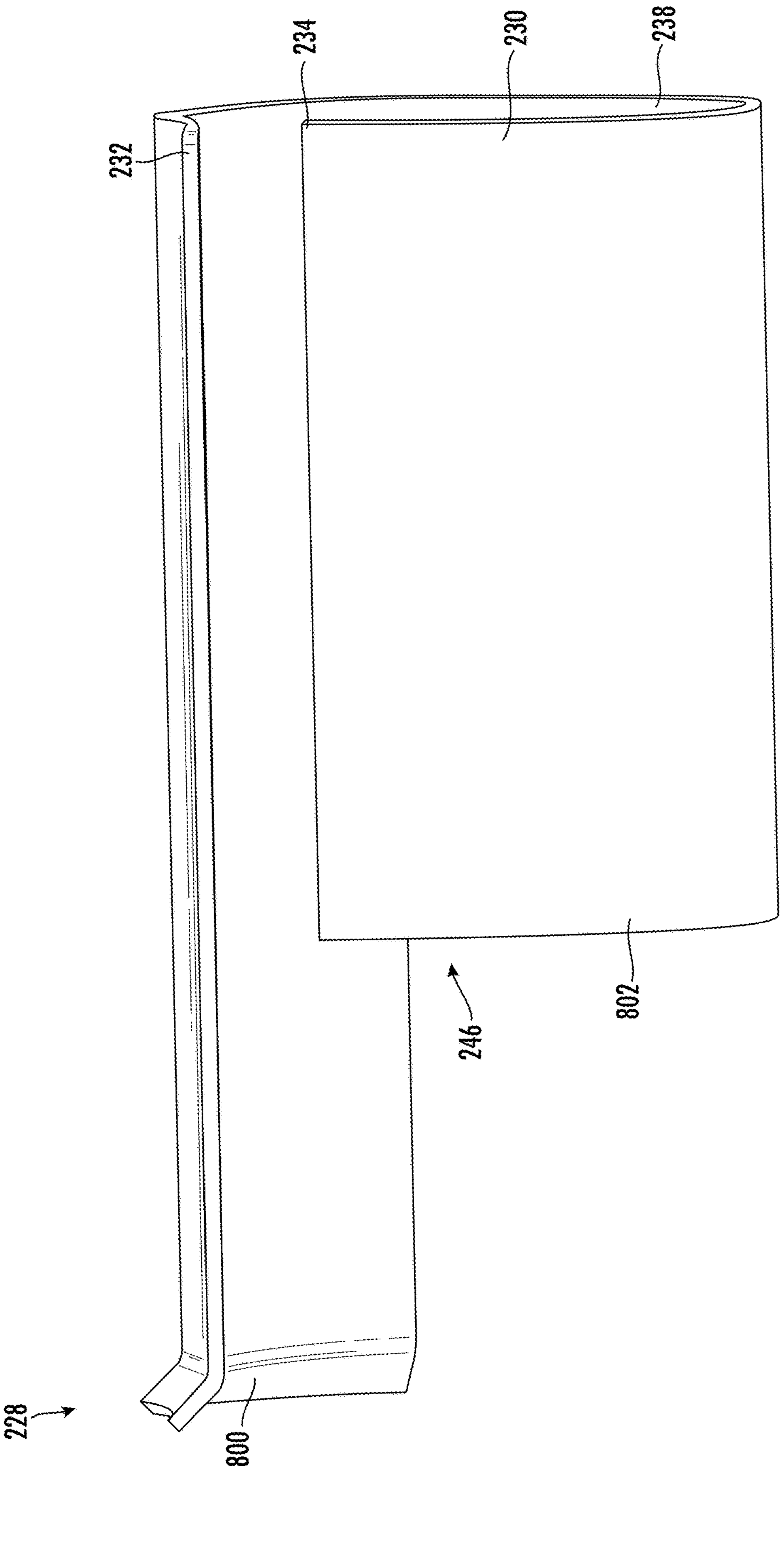
FIG. 11 is a perspective view of an example guide swirl mixer.

Referring to FIGS. 6 and 7, in some embodiments, the inlet conduit 204 includes a perforated plate 600. The perforated plate 600 is configured to restrict the flow of exhaust from the inlet conduit 204 to the decomposition conduit 210 such that the perforated plate 600 may decrease exhaust velocity prior to the exhaust flowing into the decomposition conduit 210. Reduction in exhaust velocity may have positive impacts on the decomposition chamber 108 (e.g., decrease in erosion, decrease in corrosion, decrease in leakage of reductant, etc.).

As shown in FIG. 7, the perforated plate 600 may have a plurality of perforations 700. The perforations 700 may be distributed symmetrically or asymmetrically across the perforated plate 600. For example, instead of being uniformly spaced about the perforated plate 600, the perforations 700 can be in clusters of different sizes that are not uniformly spaced about the perforated plate 600. The perforated plate 600 can have or define an asymmetrical array of perforations 700. The asymmetry of the perforations 700 can facilitate different amounts of exhaust flow through the perforated plate 600 at different locations.

The perforated plate 600 is disposed in the inlet conduit 204. At least a portion of the perimeter of the perforated plate 600 may interface with an inner surface of the inlet conduit 204. The perforated plate 600 may couple with the inlet conduit 204. The perforated plate 600 may extend from the injector side 218 to the outlet side 220. In some embodiments, the perforated plate 600 is configured such that the inlet conduit axis 208 extends through the perforated plate 600. The perforated plate 600 is configured to extend parallel to the decomposition conduit axis 212.

Referring back to FIGS. 2-5, the decomposition conduit 210 includes an endcap 222 (e.g., end plate, etc.). The endcap 222 is coupled to the decomposition conduit 210 such that the decomposition conduit axis 212 extends through the endcap 222. The endcap 222 encloses the decomposition conduit 210 such that all exhaust flowing through the decomposition conduit 210 is received from the inlet conduit 204. The inlet conduit 204 does not provide the exhaust into the decomposition conduit 210 via the endcap 222. Thus, rather than receiving the exhaust axially, such as along an axis that is parallel to the decomposition conduit axis 212, the exhaust can only enter the inlet conduit 204, which is coupled to an outer surface of the decomposition conduit 210, rather than the endcap 222.

The injector 120 is coupled to the endcap 222. The injector 120 is configured to provide the reductant along an injection axis 224 into the decomposition conduit 210. The injection axis 224 extends within the decomposition conduit 210. In some embodiments, the injection axis 224 is aligned with (e.g., coincident with) the decomposition conduit axis 212. In other embodiments, the injection axis 224 is parallel and offset from the decomposition conduit axis 212.

The decomposition chamber 108 also includes a baffle 226 (e.g., circular ring, etc.). The baffle 226 is coupled to the endcap 222. As is explained in more detail herein, the baffle 226 is configured to cooperate with the inlet conduit 204 to divert (e.g., redirect, channel, deflect, etc.) the exhaust prior to the exhaust being provided to the decomposition conduit 210. By diverting the exhaust in this way, the baffle 226 may protect the various components of the decomposition conduit 210 (e.g., a guide swirl mixer 228, etc.) from high velocity exhaust exiting the inlet conduit 204 and therefore shield the decomposition conduit 210 components from high shear stress. The protection from the baffle 226 may cause a decrease in the deterioration rate of the components of the decomposition chamber 210.

In some embodiments, the baffle 226 has a wall thickness of between 0.5 mm and 3 mm. For example, the baffle 226 can have a wall thickness of 1.2 mm. In some embodiments, the baffle 226 has a wall thickness of between 0.5 mm and 2.0 mm, 1.0 mm and 2.5 mm, 1.5 mm and 3 mm, among others.

The baffle 226 is coupled to the endcap 222 such that the decomposition conduit axis 212 extends through the baffle 226. In some embodiments, the endcap 222 includes a planar surface (e.g., circular plate, etc.). The planar surface encloses the decomposition conduit 210. The planar surface extends orthogonal to the decomposition conduit axis 212. The planar surface is configured to surround the injector 120. In some embodiments, the baffle 226 is coupled to the planar surface.

The decomposition chamber 108 further includes a guide swirl mixer 228 (e.g., plate, baffle, etc.). At least a portion of the guide swirl mixer 228 extends partially around the injection axis 224. In various embodiments, the guide swirl mixer 228 may be constructed from steel (e.g., stainless steel, SS439, SS436L, etc.). As is explained in more detail herein, the guide swirl mixer 228 is configured to cooperate with the inlet conduit 204 to concentrate (e.g., funnel, etc.) the exhaust prior to the exhaust being provided to the decomposition conduit 210. By concentrating the exhaust in this way, the inlet conduit 204 and the guide swirl mixer 228 may increase a velocity of the exhaust as the exhaust flows toward the decomposition conduit 210.

The guide swirl mixer 228 is also configured to cooperate with the decomposition conduit 210 and the endcap 222 to cause the exhaust to concentrate and cause the exhaust to swirl within the decomposition conduit 210. Specifically, a portion of the guide swirl mixer 228 extends along the endcap 222 and this portion cooperates with the endcap 222 and the decomposition conduit 210 to form a channel within which the exhaust flows. The portion of the guide swirl mixer 228 that extends along the endcap 222 may extend spirally along the endcap 222 or may extend along a circular arc along the endcap 222.

After the exhaust exits this channel (e.g., flows past the baffle 226 and the guide swirl mixer 228, etc.), the exhaust is imparted with a rotation within the decomposition conduit 210. As is explained in more detail herein, the aftertreatment system 100 harnesses this rotation to facilitate desirable mixing of the exhaust and the reductant upstream of the SCR catalyst member 110. For example, the exhaust is caused to swirl within the decomposition conduit 210. As is explained in more detail herein, the reductant may be provided into this low-pressure region so as to facilitate desirable mixing of the exhaust and the reductant upstream of the SCR catalyst member 110. In these ways, the guide swirl mixer 228 enables desirable mixing of the exhaust and reductant upstream of the SCR catalyst member 110. As used herein, a "low-pressure region" is a region where pressure of the exhaust is less than 50% (e.g., less than 41%, less than 40%, less than 35%, less than 25%, etc.) of a pressure of the exhaust within the inlet conduit 204.

The baffle 226 is separated from the guide swirl mixer 228 such that at least a portion of the baffle 226 extends around at least a portion of the guide swirl mixer 228. The baffle 226 is disposed above the guide swirl mixer 228 and is configured to protect the guide swirl mixer 228 from the impacts of the high-velocity exhaust (e.g., high shear stress on the guide swirl mixer 228, high deterioration rate, etc.) exiting the inlet conduit 204. For example, the high velocity exhaust exits the inlet conduit 208 and contacts the baffle 226, the exhaust imparts a shear stress on the baffle 226 prior to the exhaust being provided to the guide swirl mixer 228. In such example, the shear stress on the baffle 226 is greater than the shear stress on the guide swirl mixer 228.

The baffle 226 can be configured to cause an increase in back pressure. An increase in backpressure may cause undesirable impacts on the decomposition chamber 108. However, in this instance the mitigation of deterioration of the guide swirl mixer 228 outweighs the negative impacts due to the increase in backpressure.

In some embodiments, the baffle 226 extends entirely around the decomposition conduit axis 212 and thus entirely around the guide swirl mixer 228. In such embodiments, the baffle 226 is ring-shaped (e.g., annular, circular, etc.). In some embodiments, the baffle 226 extends partially around the guide swirl mixer 228. For example, the baffle 226 extends around a portion of the guide swirl mixer 228 under the inlet conduit exit opening 214. In such embodiments, the baffle 226 is half-ring shaped (e.g., half-annular, semi-circular, etc.).

The baffle 226 is separated from the guide swirl mixer 228 such that at least a portion of the baffle 226 extends between the inlet conduit exit opening 214 and at least a portion of the guide swirl mixer 228. For example, a portion of the baffle 226 is located under the inlet conduit exit opening 214 and above the guide swirl mixer 228. As is explained in more detail herein, the baffle 226 is configured to cooperate with the inlet conduit 204 to divert (e.g., redirect, channel, deflect, etc.) the exhaust as it is being provided to the decomposition conduit 210 prior to contacting the guide swirl mixer 228.

The baffle 226 is configured to extend in a direction that is parallel to the inlet conduit axis 208. The portion of exhaust that is directed along the inlet conduit axis 208 and/or a direction parallel to the inlet conduit axis 208 contacts the baffle 226 before it is provided to the guide swirl mixer 228. For example, the exhaust flows through the inlet conduit 204 (e.g., along the inlet conduit axis 208, along a direction parallel to the inlet conduit axis 208) and the inlet conduit exit opening 214, the exhaust contacts the baffle 226 and is diverted (e.g., away from the endcap 222, etc.) prior to entering the guide swirl mixer 228. In some embodiments, the inlet conduit axis 208 intersects the baffle 226.

In some embodiments, the endcap 222 is disposed along a plane (e.g., the planar surface extends along a plane, etc.). For example, the planar surface extends along a plane. The baffle 226 has a length L1 in a direction orthogonal to the plane. In various embodiments, the length L1 is between 5 millimeters and 40 millimeters. For example, the length L1 can be 20 millimeters. The length L1 can also be between 10 millimeters and 35 millimeters, 15 millimeters and 30 millimeters, 20 millimeters and 25 millimeters, among others.

The guide swirl mixer 228 has a length L2 in the direction (e.g., orthogonal to the plane). In some embodiments, the length L2 is greater than the length L1. For example, the baffle 226 can extend from the endcap 222 to a first location along the decomposition conduit axis 212 and the guide swirl mixer 228 can extend from the endcap 222 to a second location along the decomposition conduit axis 212, the first location is closer to the endcap 222 than the second location. In such embodiments, the exhaust can contact the baffle 226 and flow into the guide swirl mixer 228.

The length L1 and the length L2 may be variously selected such that the decomposition chamber 108 is tailored for a target application. For example, by increasing the length L1, shear stress on the guide swirl mixer 228 may be reduced. For example, increasing the length L2 may increase mixing of the exhaust and reductant.

The guide swirl mixer 228 includes a first edge 230. The first edge 230 is coupled to the endcap 222. The baffle 226 extends over the first edge 230. The first edge 230 cooperates with the endcap 222 and the decomposition conduit 210 to form a channel within which the exhaust flows. The first edge 230 may extend spirally along the endcap 222 or may extend along a circular arc along the endcap 222. In some embodiments, the first edge 230 is coupled to the planar surface. In some embodiments, the first edge 230 is coupled to a portion of the endcap 222 radially inward relative to the portion in which the baffle 226 is coupled.

The guide swirl mixer 228 includes a second edge 232. The second edge 232 extends from the first edge 230 in a direction away from the endcap 222. The baffle 226 extends over a portion of the second edge 232. In some embodiments, the second edge 232 extends in a direction perpendicular to the endcap 222. In some embodiments, the second edge 232 extends in a direction perpendicular to the planar surface. The second edge 232 is located at an inlet conduit side of the injection axis 224. For example, the second edge 232 is disposed under the inlet conduit exit opening 214. The second edge 232 is located under the baffle 226. The second edge 232 is located under the portion of the baffle 226 that extends between the inlet conduit exit opening 214 and the guide swirl mixer 228 which allows for the protection of the guide swirl mixer 228.

The guide swirl mixer 228 includes a third edge 234. The third edge 234 extends from the first edge 230 in a direction away from the endcap 222. In some embodiments, the third edge 234 extends in a direction perpendicular to the endcap 222. The baffle 226 extends over a portion of the third edge 234. In embodiments in which the baffle 226 is half-ring shaped the baffle 226 does not extend over the third edge 234. In some embodiments, the third edge 234 extends in a direction perpendicular to the planar surface. The third edge 234 is located on a side opposite the inlet conduit side of the injection axis 224. For example, the third edge 234 is on a side opposite of the inlet conduit exit opening 214.

The guide swirl mixer 228 includes a flat segment 236. The flat segment 236 extends from the second edge 232. In some embodiments, the flat segment 236 is disposed under the inlet conduit exit opening 214. The baffle 226 is separated from the flat segment 236 by a first distance. For example, the first distance is the distance between a portion of the baffle 226 (e.g., the portion that extends between the inlet conduit exit opening 214 and the guide swirl mixer 228) and the flat segment 236. In some embodiments, the flat segment 236 is omitted.

Figure 4:
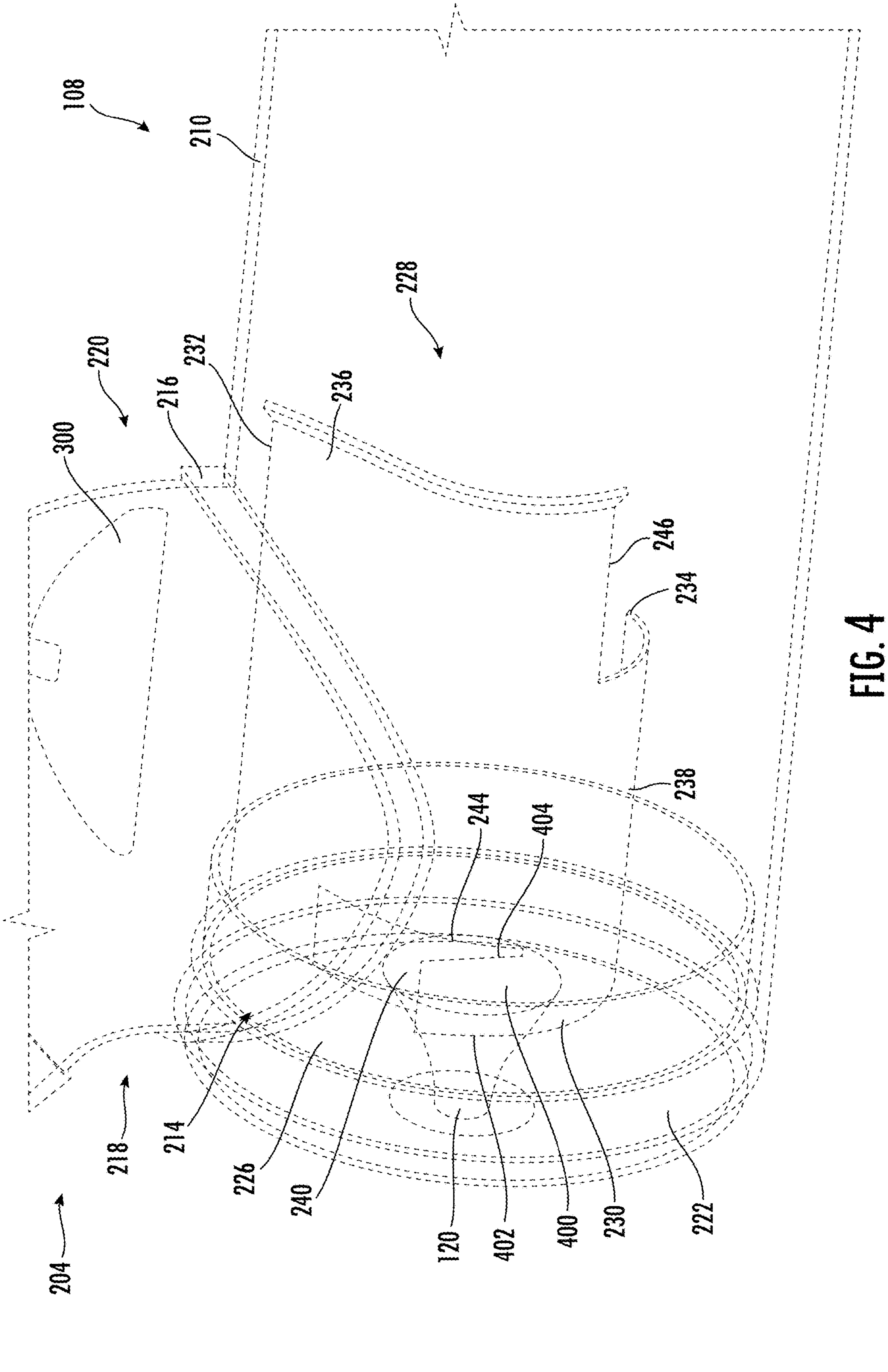
FIG. 4 is a perspective partial transparency view of a portion of the decomposition chamber of FIG. 2.
Figure 5:
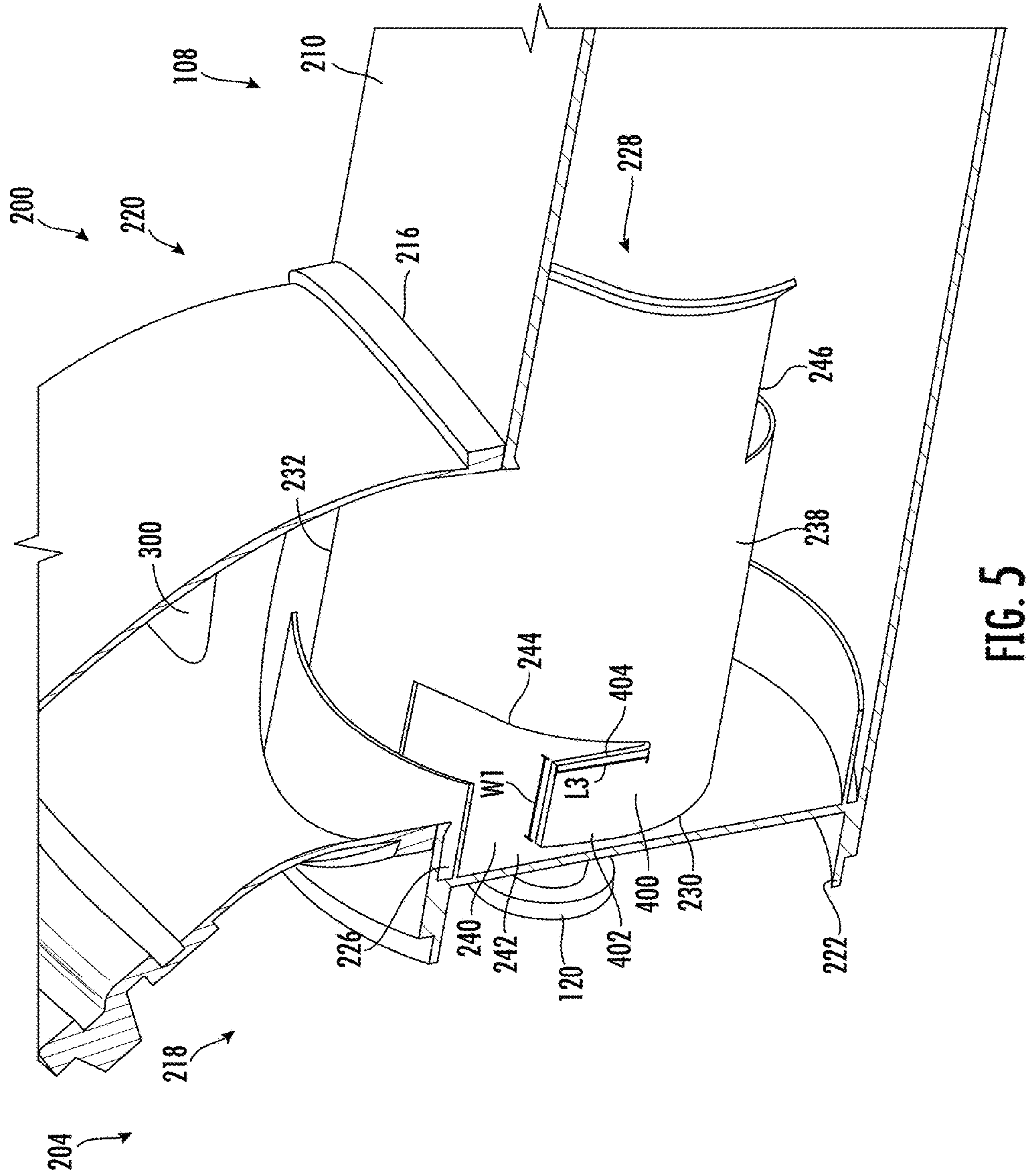
FIG. 5 is a perspective cross-sectional view of a portion of the decomposition chamber of FIG. 2.

The guide swirl mixer 228 includes curved segment 238. The curved segment 238 may be contiguous with the flat segment 236. The curved segment 238 may extend at least partially around the decomposition conduit axis 212. Thus, the guide swirl mixer 228 may form a "C" or "J" shape to generate a swirl of exhaust within the decomposition conduit 210. The baffle 226 is separated from the curved segment 238 by a second distance. For example, the second distance is the distance between a portion of the baffle 226 (e.g. a portion of the baffle 226 disposed opposite of an inlet conduit exit opening side) and the curved segment 238. In some embodiments, the first distance is greater than the second distance. In some embodiments, the first distance is less than the second distance, as shown in FIG. 4. In some embodiments, the first distance is equal to the second distance. In some embodiments, the guide swirl mixer 228 may only include the curved segment 238.

The curved segment 238 forms a low-pressure region of exhaust which the exhaust is caused to rotate by the curved segment 238. Formation of the low-pressure region by the curved segment 238 enables location of the injection axis 224 within the low-pressure region. Injection of the reductant into the low-pressure region enables the reductant to flow at greater distances into the decomposition conduit 210 along the injection axis 224. By providing the reductant in this way, mixing of the reductant within the exhaust may be increased which may correspondingly increase a conversion efficiency of the SCR catalyst member 110.

In various embodiments, the flat segment 236 is not tangential to the curved segment 238. In other words, the flat segment 236 does not extend along a tangent of the curved segment 238. Instead, the curved segment 238 extends from the flat segment 236 so as to cause the exhaust to flow radially outwards and towards the decomposition conduit 210. The arrangement may result in further concentration of the exhaust between the curved segment 238, the decomposition conduit 210, and the endcap 222.

In some embodiments, the plane along which the inlet conduit axis 208 and the decomposition conduit axis 212 extends intersects the guide swirl mixer 228 and the baffle 226 at two locations. For example, the plane may intersect the flat segment 236 and also intersect the curved segment 238. For example, the plane may intersect a first portion of the baffle 226 (e.g., the portion disposed between the inlet conduit exit opening 214 and the flat segment 236) and a second portion of the baffle 226, opposite the first portion.

The curved segment 238 may have various diameters in various embodiments. For instance, as shown, the curved segment 238 may form a relatively full "C" shape (i.e., generally a semicircular configuration). However, in some embodiments, a reduced diameter may be used. For instance, the curved segment 238 may have a more open configuration (i.e., generally a partial oval configuration). A reduced diameter of the curved segment may reduce backpressure in the exhaust conduit system 104.

At least a portion of the curved segment 238 may extend around at least a portion of a spray cone of the injector 120. As a result, the injection axis 224 extends into at least a portion of the low-pressure region of the exhaust within the decomposition conduit 210. Additionally, the exhaust is caused by the guide swirl mixer 228 to swirl around the injection axis 224. The reductant is thus enabled to flow further along a length of the decomposition conduit 210, which increases mixing of the reductant within the exhaust and therefore increases a conversion efficiency of the SCR catalyst member 110.

The exhaust thus flows between the curved segment 238, the decomposition conduit 210, and the endcap 222 which increases the velocity of the exhaust. This arrangement also causes the exhaust to swirl within the decomposition conduit 210 downstream of the curved segment 238. This swirl extends around a low-pressure region (e.g., the swirl creates a vorticity, etc.). By variously configuring the guide swirl mixer 228 and locating the injector 120, the reductant may be injected into the low-pressure region. This enables the reductant to travel further downstream within the decomposition conduit 210 prior to becoming entrained in the swirling exhaust within the decomposition conduit 210, which enhances mixing of the reductant and the exhaust.

The guide swirl mixer 228 includes a slot 240 (e.g., aperture, window, etc.). The slot 240 is contiguous with the endcap 222. In some embodiments, the slot 240 is disposed on the curved segment 238. In some embodiments, the slot 240 is disposed on the flat segment 236. In some embodiments, the slot 240 is disposed on the curved segment 238 and the flat segment 236. The exhaust flows between the guide swirl mixer 228 and the endcap 222 such that the exhaust flows between a portion of the guide swirl mixer 228 (e.g., the flat segment 236, the curved segment 238, the flat segment 236 and the curved segment 238) and the endcap 222 via the slot 240.

The slot 240 facilitates separation of a portion of the exhaust flowing within the guide swirl mixer 228 from a remainder of the exhaust flowing within the guide swirl mixer 228. The portion of the exhaust that flows through the slot 240 is imparted with a rotation due to the guide swirl mixer 228 and this portion of the exhaust uses this rotation to swirl between the guide swirl mixer 228 and the decomposition conduit 210 after flowing through the slot 240. In this way, the slot 240 provides additional swirl and therefore facilitates additional mixing of the reductant and the exhaust.

The slot 240 functions as an exhaust assist feature which enables a portion of the exhaust to flow from between the guide swirl mixer 228 and the endcap 222, through the guide swirl mixer 228 and into the low-pressure region. This portion of the exhaust assists in propelling the reductant along the injection axis 224 into the decomposition conduit 210 and creates a second swirl of the exhaust. The second swirl extends within the low-pressure region created by the first swirl of exhaust (e.g., created by the exhaust that does not flow through the slot 240, etc.). In some embodiments, the slot 240 provides the exhaust across a tip of the injector 120. In this way the slot 240 mitigates formation of deposits proximate to the tip of the injector 120.

At least a portion of the baffle 226 overlaps at least a portion of the slot 240 when viewed in a direction parallel to the inlet conduit axis 208. For example, the slot 240 includes an upstream side 242 contiguous with the endcap 222, and a downstream side 244 separated from the endcap 222, the baffle 226 extends from the endcap 222 and covers a portion of the slot 240 between the upstream side 242 and the downstream side 244. The baffle 226 is configured to limit the volume of exhaust flowing between the endcap 222 and the guide swirl mixer 228 and through the guide swirl mixer 228. The decreased volume of exhaust may cause a decrease in reductant being propelled through the decomposition conduit 210. However, in this instance the mitigation of deterioration of the guide swirl mixer 228 outweighs the negative impacts due to the decrease in the volume of reductant propelled through the decomposition conduit 210.

The guide swirl mixer 228 includes a plate 400 (e.g., flap, tab, etc.). The plate 400 is contiguous with the slot 240 and extends radially outward and away from the injection axis 224. As a result, the plate 400 functions to guide exhaust that is flowing around the guide swirl mixer 228 into the slot 240, thereby enhancing mixing of the reductant and the exhaust.

The plate 400 extends along a plane. The plate 400 has a length L3 along the plane. In various embodiments, the length L3 is between 0 millimeters and 40 millimeters. For example, the length L3 can be 20 millimeters. The length L3 can also be between 0 millimeters and 30 millimeters, 5 millimeters and 25 millimeters, 10 millimeters and 40 millimeters, among others.

The plate 400 has a width W1 along the plane. In various embodiments, the width W1 is between 0 millimeters and 20 millimeters. For example, the width W1 can be 10 millimeters. The width W1 can also be between 0 millimeters and 10 millimeters, 5 millimeters and 15 millimeters, 10 millimeters and 20 millimeters, among others.

At least a portion of the baffle 226 overlaps at least a portion of the plate 400 when viewed in the direction (e.g., parallel to the inlet conduit axis 208, etc.). For example, the plate 400 includes an upstream side 402 contiguous with the endcap 222, and a downstream side 404 separated from the endcap 222. The baffle 226 extends from the endcap 222 and covers a portion of the plate 400 between the upstream side 402 and the downstream side 404. The baffle 226 is configured to protect the plate 400 from the high-velocity exhaust exiting the inlet conduit 204. The baffle 226 shields a portion of the plate 400 from shear stress from the exhaust. The baffle 226 may decrease the deterioration rate of the plate 400. The baffle 226 is separated from the slot 240 by a first distance. The baffle 226 is separated from the plate 400 by a second distance. The first distance is less than the second distance.

The baffle 226 is configured to limit the volume of exhaust that the plate 400 guides into the guide swirl mixer 228. The decrease in volume of exhaust flowing across the plate 400 and into the slot 240 may decrease the shear stress from the exhaust on the plate 400. In this way, the baffle 225 may mitigate deterioration of the guide swirl mixer 228.

The guide swirl mixer 228 also includes a window 246 (e.g., slot, aperture, etc.). The window 246 may be disposed on the curved segment 238. The window 246 is configured to facilitate passage of the exhaust through the guide swirl mixer 228 independent of the slot 240. In various embodiments, the window 246 is aligned with the slot 240. The window 246 facilitates separation of a portion of the exhaust flowing within the guide swirl mixer 228 from the remainder of the exhaust flowing through the guide swirl mixer 228. The portion of exhaust that flows through the window 246 is imparted with a rotation due to guide swirl mixer 228 and the decomposition conduit 210, and this portion uses this rotation to swirl between the guide swirl mixer 228 and the decomposition conduit 210 after flowing through the window 246. In this way, the window 246 provides additional swirl, and therefore facilitates additional mixing of reductant and exhaust. The swirl provided by the window 246 may enhance the swirl provided by the slot 240, and the swirl provided by the slot 240 may enhance the swirl provided by the window 246.

By locating the window 246 at various distances from the endcap 222, the location of the swirl provided by the window 246 can be tailored for a target application. For example, the window 246 may be located at a distance from the endcap 222 that is selected based on a characteristic (e.g., spray cone geometry, etc.) of the injector 120. The window 246 decreases backpressure provided by the guide swirl mixer 228 and, similar to the slot 240, functions as an exhaust assist feature which enables a portion of the exhaust to flow through the guide swirl mixer 228 and into the low-pressure region. This portion of the exhaust assists in propelling the reductant along the injection axis 224 into the decomposition conduit 210.

Additionally, the slot 240 and/or the window 246 may function to mitigate recirculation near a tip of the injector 120 and therefore reduce deposit formation. The window 246 may be located in such a manner that a spray cone of the injector 120 (e.g., a volume which the injector sprays the reductant, etc.) does not impinge on an internal surface of the guide swirl mixer 228. As a result, the window 246 may reduce formation of deposits and provide an additional decrease in backpressure.

Figure 3:
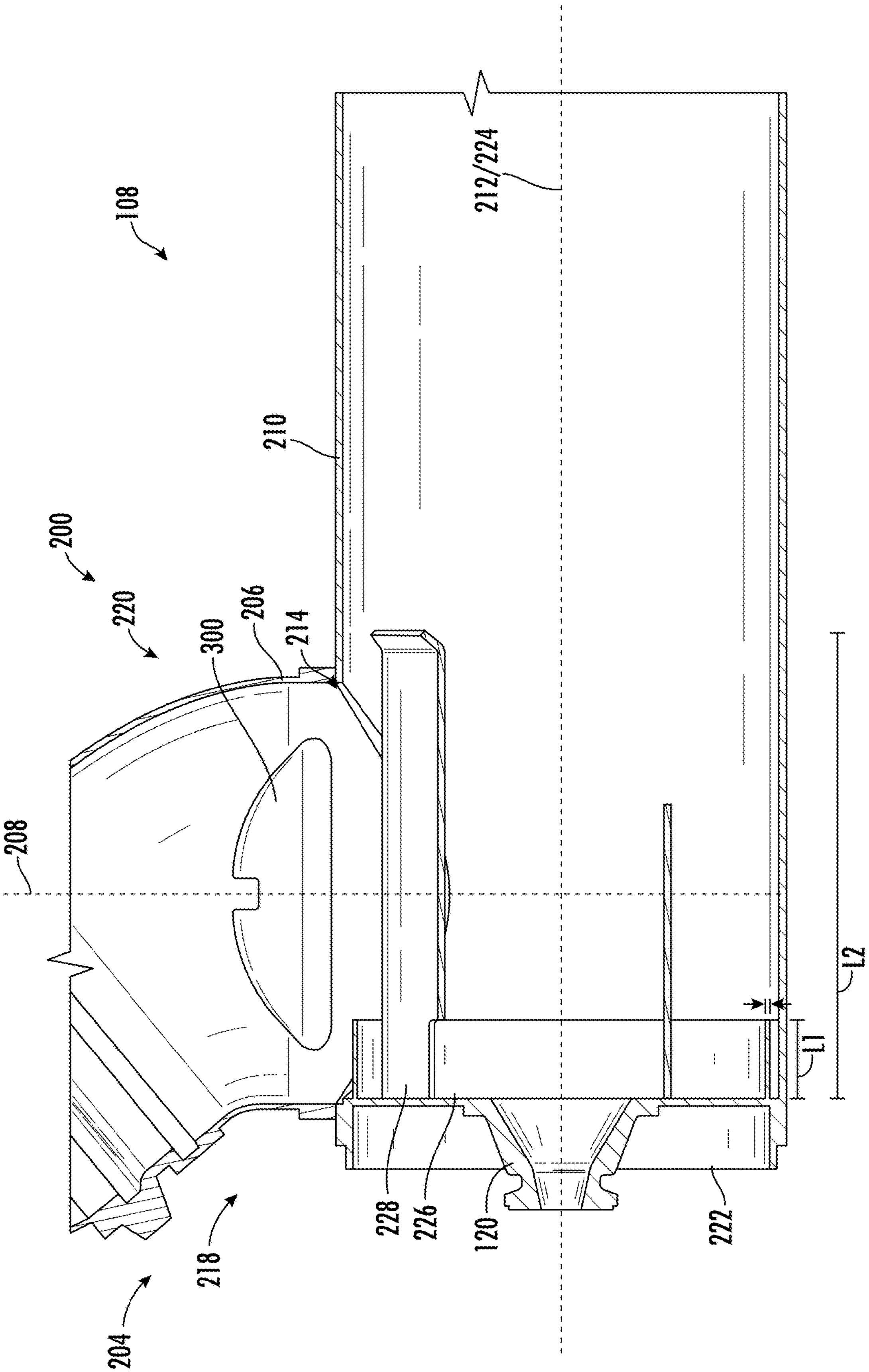
FIG. 3 is a cross-sectional view of a portion of the decomposition chamber of FIG. 2.

The inlet conduit 204 also includes a deflection plate 300 (e.g., deflector, baffle, etc.), as shown in FIG. 3. The deflection plate 300 is coupled to the inlet conduit 204 and extends towards the injector side 218. The deflection plate 300 functions to assist the guide swirl mixer 228 in concentrating the exhaust into the swirl flow produced by the guide swirl mixer 228. In some embodiments, the deflection plate 300 is omitted from the inlet conduit 204.

The deflection plate 300 includes a deflector 302 (e.g., deflection surface, etc.). The deflector 302 extends from the inlet conduit 204 proximate the outlet side 220 downwardly (e.g., towards the endcap 222, etc.) and towards the injector side 218, and therefore the injector 120. In some embodiments, the deflector 302 is coupled to the inlet conduit 204. For example, the deflector 302 may include a tab (e.g., a projection, etc.) that is welded or fastened to the inlet conduit 204. The deflection plate 300 also includes a support 304 (e.g., deflector wall, etc.). The support 304 extends from the inlet conduit 204 proximate the outlet side 220 towards the injector side 218. A length of the support may be tailored to provide a target concentration of the exhaust. The support may be coupled to the inlet conduit 204.

As shown in FIGS. 8-11, in some embodiments the guide swirl mixer 228 includes a first portion 800 and a second portion 802. The first portion 800 is configured to produce a swirl of exhaust in a first direction (e.g., clockwise, counterclockwise, etc.). The first portion 800 extends around a portion of the injection axis 224. In some embodiments, the first portion 800 extends from the flat segment 236 to a portion of the curved segment 238. The first portion 800 extends between 0 degrees and at most 210 degrees around the injection axis 224. For example, the first portion 800 can extend between 0 degrees and 200 degrees around the injection axis. In some embodiments, the first portion 800 extends between 0 degrees and 200 degrees, 0 degrees and 180 degrees, 0 degrees and 160 degrees among others.

The second portion 802 extends from the first portion 800. In some embodiments, the second portion 802 is integrally formed with the first portion 800. The second portion 802 is configured to shield the injector 120 from high-velocity exhaust exiting the inlet conduit 204. The second portion 802 is configured to produce a counter swirl of exhaust in a second direction (e.g., clockwise, counterclockwise, etc.), opposite of the first direction. The combination of the swirl and the counter swirl of exhaust, as shown by the arrows in FIG. 9, can enhance mixing of exhaust and reductant.

The second portion 802 extends around a portion of the injection axis 224. In some embodiments, the second portion extends only on the curved segment 238. The second portion

802 extends from the first portion 800 to between 220 degrees to 300 degrees. For example, in embodiments in which the first portion 800 extends from 0 degrees to 200 degrees, the second portion 802 can extend from 200 degrees to 270 degrees. In some embodiments, the second portion 802 can extend from the first portion 800 to between 230 degrees and 290 degrees, from the first portion 800 to between 240 degrees and 280 degrees, from the first portion 800 to between 250 degrees and 270 degrees, among others.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A decomposition chamber for an aftertreatment system, the decomposition chamber comprising:
- an inlet conduit configured to receive exhaust, the inlet conduit having an inlet conduit exit opening;
- a decomposition conduit coupled to the inlet conduit;
- an endcap coupled to the decomposition conduit;
- an injector coupled to the endcap and configured to provide reductant into the decomposition conduit along an injection axis;
- a guide swirl mixer coupled to the endcap such that at least a portion of the guide swirl mixer extends partially around the injection axis; and
- a baffle coupled to the endcap and separated from the guide swirl mixer such that: (i) at least a portion of the baffle extends around at least a portion of the guide swirl mixer; (ii) at least a portion of the baffle extends between the inlet conduit exit opening and at least a portion of the guide swirl mixer; and (iii) an inner surface of the baffle faces an outer surface of the guide swirl mixer.

2. The decomposition chamber of claim 1, wherein:
- the inlet conduit is centered on an inlet conduit axis;
- the decomposition conduit is centered on a decomposition conduit axis; and
- the inlet conduit axis is orthogonal to the decomposition conduit axis.

3. The decomposition chamber of claim 1, wherein:
- the endcap is disposed along a plane;
- the baffle has a length in a direction orthogonal to the plane; and
- the length is between 5 millimeters and 40 millimeters.

4. The decomposition chamber of claim 2, wherein the baffle extends in a direction that is parallel to the inlet conduit axis.

5. The decomposition chamber of claim 2, wherein the baffle is coupled to the endcap such that the decomposition conduit axis extends through the baffle.

6. The decomposition chamber of claim 1, wherein the baffle is coupled to the endcap such that the injection axis extends through the baffle.

7. The decomposition chamber of claim 2, wherein the baffle extends entirely around the decomposition conduit axis.

8. The decomposition chamber of claim 7, wherein the baffle is ring-shaped.

9. The decomposition chamber of claim 1, wherein:
the endcap is disposed along a plane;
the baffle has a first length in a direction orthogonal to the plane;
the guide swirl mixer has a second length in the direction; and
the second length is greater than the first length.

10. The decomposition chamber of claim 1, wherein:
the guide swirl mixer further comprises:
a first edge at which the guide swirl mixer is coupled to the endcap,
a second edge that extends from the first edge in a direction away from the endcap, the second edge located on an inlet conduit side of the injection axis,
a third edge that extends from the first edge in a direction away from the endcap, the third edge being on a side opposite the inlet conduit side of the injection axis,
a flat segment that extends from the second edge, and
a curved segment that curves only partially around the injection axis and extends from the flat segment to the third edge;
the baffle is separated from the flat segment by a first distance;
the baffle is separated from the curved segment by a second distance; and
the first distance is greater than the second distance.

11. The decomposition chamber of claim 1, wherein:
the guide swirl mixer further comprises:
a first edge at which the guide swirl mixer is coupled to the endcap,
a second edge that extends from the first edge in a direction away from the endcap, the second edge located on an inlet conduit side of the injection axis,
a third edge that extends from the first edge in a direction away from the endcap, the third edge being on a side opposite the inlet conduit side of the injection axis,
a flat segment that extends from the second edge, and
a curved segment that curves only partially around the injection axis and extends from the flat segment to the third edge;
the baffle is separated from the flat segment by a first distance;
the baffle is separated from the curved segment by a second distance; and
the first distance is less than the second distance.

12. The decomposition chamber of claim 1, wherein:
the guide swirl mixer further comprises:
a first edge at which the guide swirl mixer is coupled to the endcap,
a second edge that extends from the first edge in a direction away from the endcap, the second edge located on an inlet conduit side of the injection axis,
a third edge that extends from the first edge in a direction away from the endcap, the third edge being on a side opposite the inlet conduit side of the injection axis,
a flat segment that extends from the second edge, and
a curved segment that curves only partially around the injection axis and extends from the flat segment to the third edge;
the baffle is separated from the flat segment by a first distance;
the baffle is separated from the curved segment by a second distance; and
the first distance is equal to the second distance.

13. The decomposition chamber of claim 1, wherein:
the guide swirl mixer further comprises a slot contiguous with the endcap; and
at least a portion of the baffle overlaps at least a portion of the slot when viewed in a direction parallel to an inlet conduit axis of the inlet conduit.

14. The decomposition chamber of claim 13, wherein:
the guide swirl mixer further comprises a plate contiguous with the slot, the plate extending radially outward and away from the injection axis; and
at least a portion of the baffle overlaps at least a portion of the plate when viewed in the direction.

15. The decomposition chamber of claim 14, wherein:
the baffle is separated from the slot by a first distance;
the baffle is separated from the plate by a second distance; and
the first distance is greater than the second distance.

16. The decomposition chamber of claim 13, wherein:
the guide swirl mixer further comprises:
a first edge at which the guide swirl mixer is coupled to the endcap,
a second edge that extends from the first edge in a direction away from the endcap, the second edge located on an inlet conduit side of the injection axis,
a third edge that extends from the first edge in a direction away from the endcap, the third edge being on a side opposite the inlet conduit side of the injection axis,
a flat segment that extends from the second edge, and
a curved segment that curves only partially around the injection axis and extends from the flat segment to the third edge;
the baffle is separated from the flat segment by a first distance;
the baffle is separated from the curved segment by a second distance; and
the first distance is less than the second distance.

17. The decomposition chamber of claim 12, wherein:
the guide swirl mixer further comprises a slot contiguous with the endcap; and
at least a portion of the baffle overlaps at least a portion of the slot when viewed in a direction parallel to an inlet conduit axis of the inlet conduit.

18. The decomposition chamber of claim 17, wherein:
the guide swirl mixer further comprises a plate contiguous with the slot, the plate extending radially outward and away from the injection axis; and
at least a portion of the baffle overlaps at least a portion of the plate when viewed in the direction.

19. The decomposition chamber of claim 18, wherein:
the baffle is separated from the slot by a first distance;
the baffle is separated from the plate by a second distance; and
the first distance is greater than the second distance.

20. The decomposition chamber of claim 17, wherein:
the endcap is disposed along a plane;
the baffle has a first length in a direction orthogonal to the plane;

the guide swirl mixer has a second length in the direction; and the second length is greater than the first length.

* * * * *